US006187837B1

(12) United States Patent
Pearce

(10) Patent No.: US 6,187,837 B1
(45) Date of Patent: Feb. 13, 2001

(54) ELASTOMERIC PODALIC PADS

(75) Inventor: Tony M. Pearce, Alpine, UT (US)

(73) Assignee: EdiZone, LC, Pleasant Grove, UT (US)

( * ) Notice: Under 35 U.S.C. 154(b), the term of this patent shall be extended for 0 days.

(21) Appl. No.: 09/085,235

(22) Filed: May 27, 1998

Related U.S. Application Data

(63) Continuation-in-part of application No. 08/783,413, filed on Jan. 10, 1997.
(60) Provisional application No. 60/047,790, filed on May 27, 1997, and provisional application No. 60/021,019, filed on Jul. 1, 1996.
(51) Int. Cl.$^7$ .......................... A43B 13/04; A43B 21/32; A43B 19/00; C09J 9/32; C08L 53/02
(52) U.S. Cl. .................. 523/105; 523/219; 524/274; 524/476; 524/505; 524/578; 524/579; 36/32 R; 36/37; 36/71
(58) Field of Search ...................................... 523/105, 219; 524/274, 505, 578, 579, 476; 36/32 R, 71, 37

(56) References Cited

U.S. PATENT DOCUMENTS

| | | | | |
|---|---|---|---|---|
| 4,377,655 | * | 3/1983 | Himes | 524/505 |
| 5,681,649 | * | 10/1997 | Mashita et al. | 36/72 R |
| 5,766,704 | * | 6/1998 | Allen et al. | 523/105 |
| 5,994,450 | * | 11/1999 | Pearce . | |

* cited by examiner

Primary Examiner—Peter A. Szekely
(74) Attorney, Agent, or Firm—Daniel McCarthy; Brick G. Power

(57) ABSTRACT

Podalic foot pads of various shapes and configurations which utilize a padding material that is primarily an A-B-A triblock copolymer and a plasticizer. A-B diblock copolymers may be compounded into the padding material. An anti-bleed agent is preferably employed. The plasticizer may be a resin, mineral oil or otherwise. A detackifier may be employed such as grape seed oil or another slip agent. Antioxidants, pigments and micropsheres may be added to the material. The material has good cushioning properties.

6 Claims, 24 Drawing Sheets

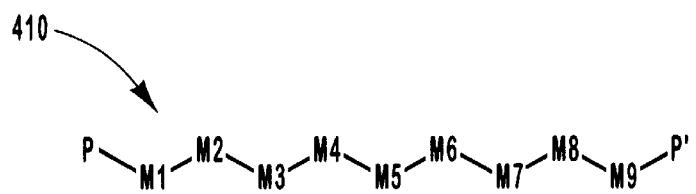
FIG. 4a
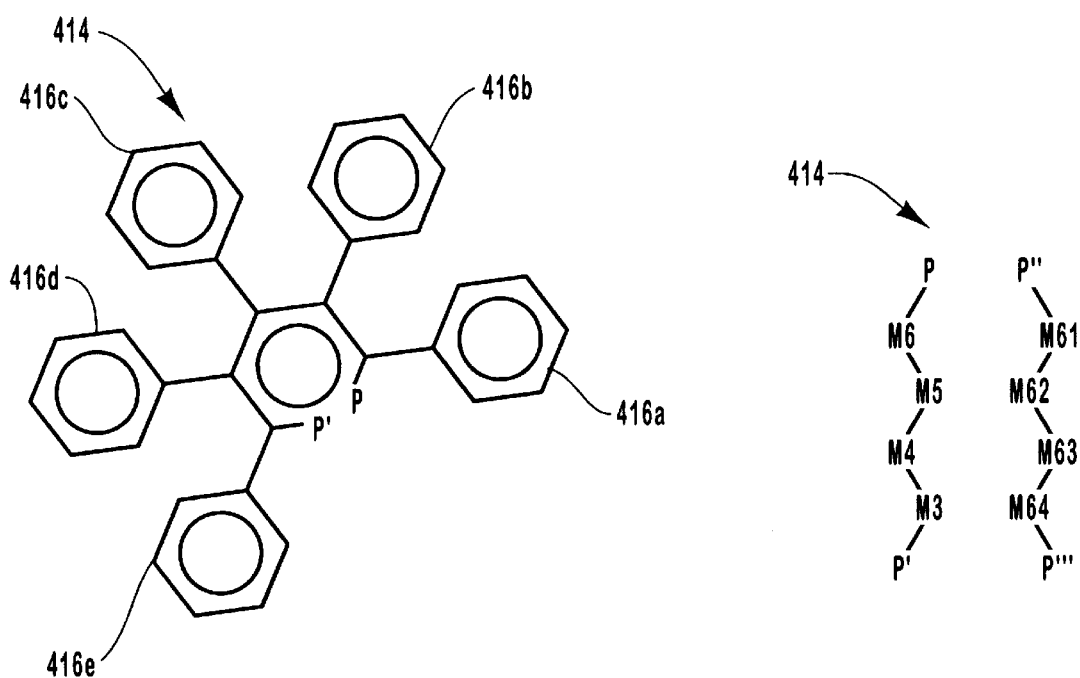
FIG. 4b
FIG. 4c
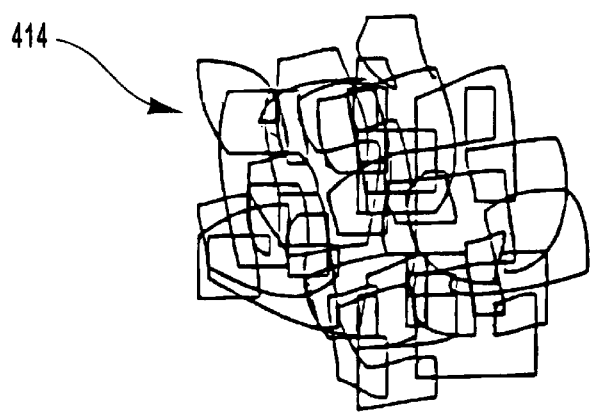
FIG. 4d

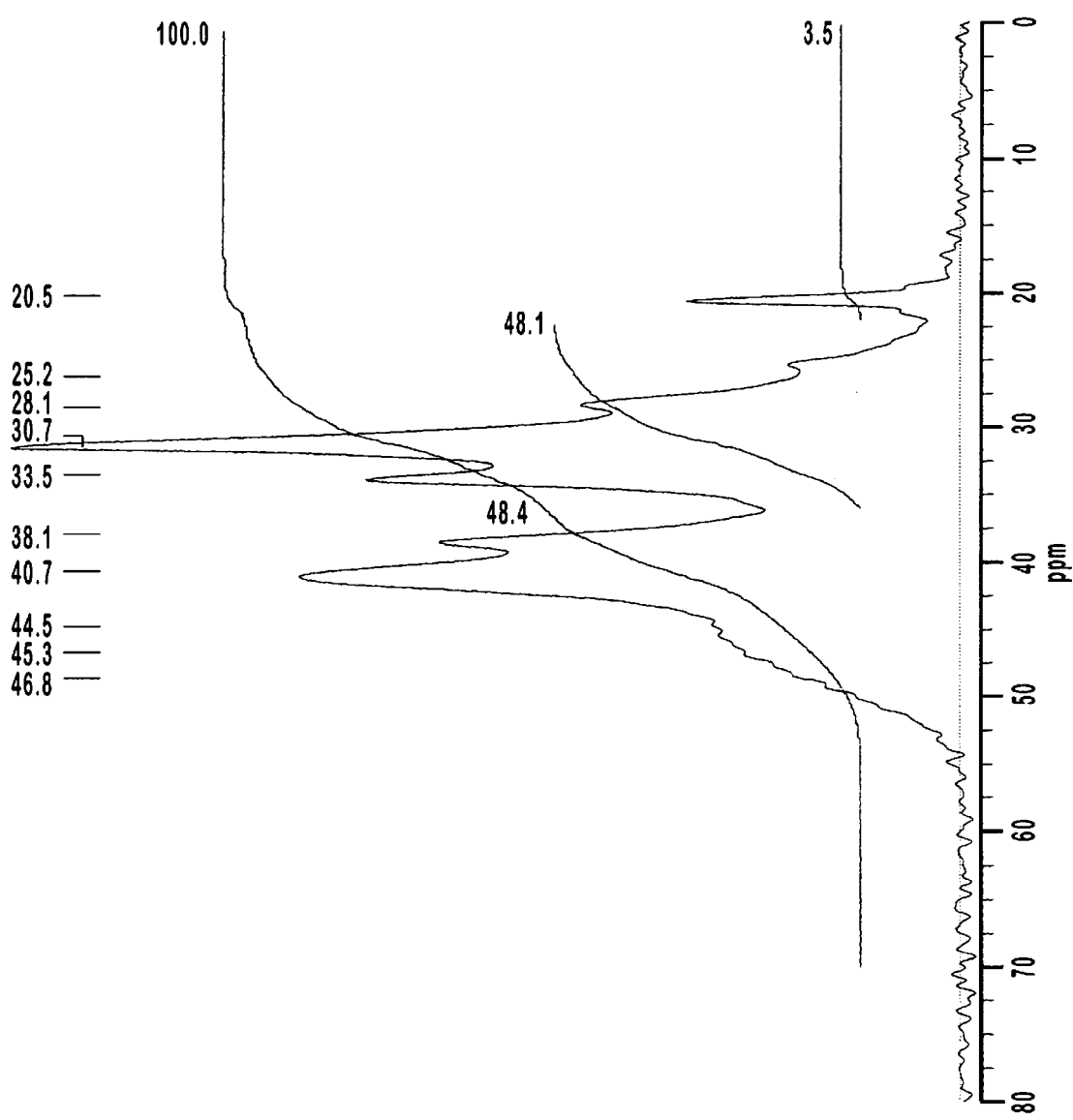

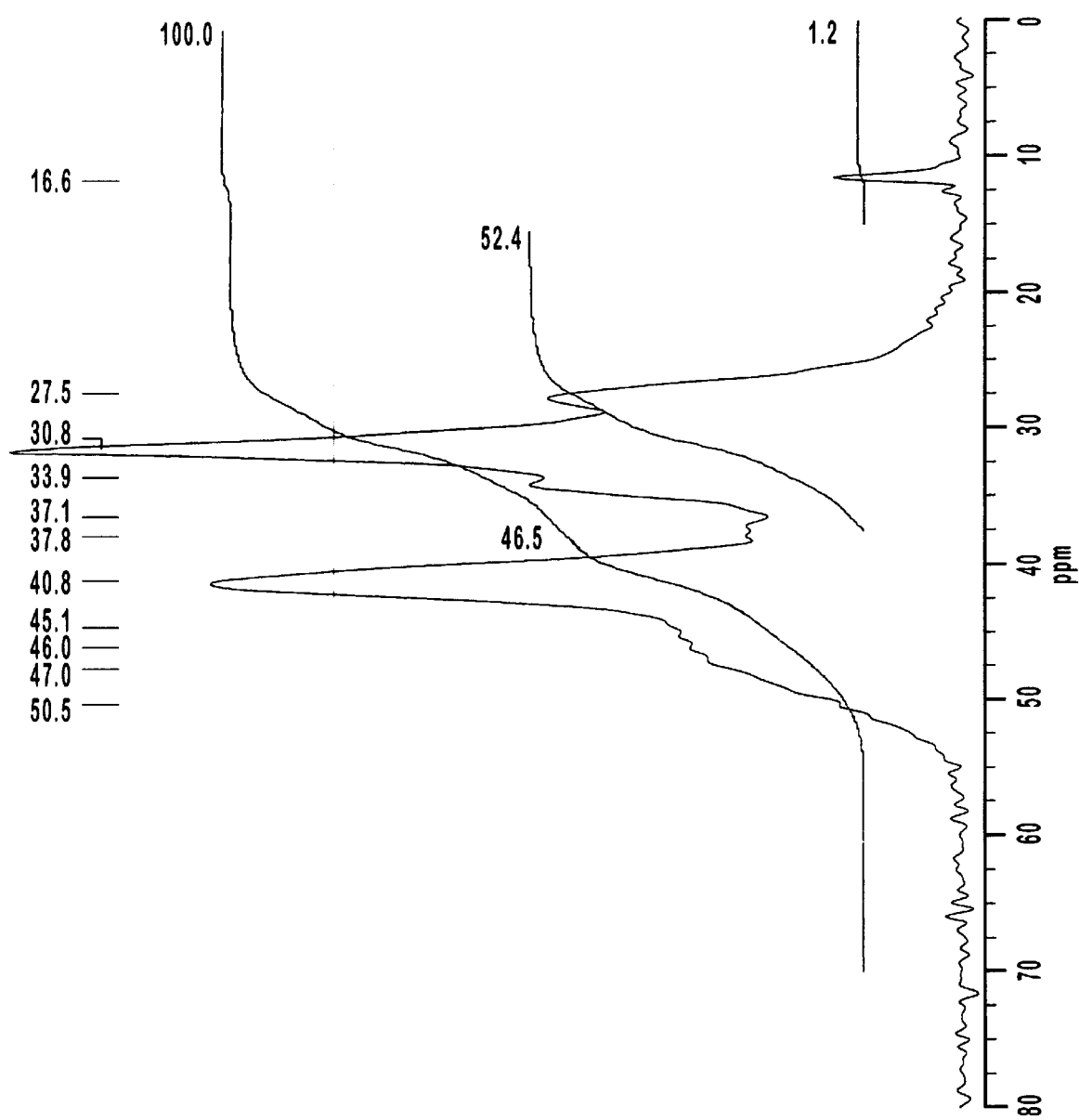

ELASTOMERIC PODALIC PADS

Claim for Priority: Priority is hereby claimed to U.S. Provisional Patent application Ser. No. 60/047,790 filed on May 27, 1997. And also a C-I-P of U.S. patent application Ser. No. 08/783,413 filed on Jan. 10, 1997, and to the application which it claims priority to, U.S. Provisional Patent application Ser. No. 60/021,019 filed on Jul. 1, 1996.

I. FIELD OF THE INVENTION

The present invention relates to cushioning pads for use in connection with human feet. More particularly, the invention relates to elastomeric and viscoelastomeric podalic pads for use in footwear.

II. BACKGROUND OF THE INVENTION

A. Background of Related Art

In the prior art, it was known that cushioning material could be formed from elastomeric gels (see, e.g., U.S. Pat. No. 5,334,646, issued on Aug. 2, 1994 in the name of John Y. Chen), foam rubber, lubricated microspheres (see, U.S. Pat. Nos. 5,421,874 and 5,549,743, issued on Jun. 6, 1995 and Aug. 27, 1996, respectively, both in the name of Tony M. Pearce) and other substances.

The addition of adhesives to elastomeric materials is also well known. For example, REGALREZ® resins have been suggested for use in combination with KRATON® thermoplastic rubbers (see U.S. Pat. No. 4,833,193, col. 2, lines 22–27, issued on May 23, 1989 in the name of David L. Sieverding). Many of those combinations include a substantial amount of KRATON®. Some REGALREZ®/KRATON® combinations of the prior art even include greater amounts of KRATON® than REGALREZ®. Many prior art adhesive elastomeric materials employ small amounts of resins.

U.S. Pat. No. 4,833,193, issued on May 23, 1989 in the name of Sieverding, which is hereby incorporated by reference, discusses pressure sensitive adhesives. Applicant believes that the formulations disclosed in the '193 patent is the closest prior art to the formulations of his invention. It is important to note, however, that Sieverding's work was primarily directed to adhesives, not cushioning. The adhesive materials of that patent contain from about 2 to about 40 weight percent triblock copolymer of the general configuration A-B-A, alone or in combination with a diblock copolymer (col. 12, lines 8–14), at least 20 weight percent of a low molecular weight resin (col. 12, lines 15–18) and up to about 80 weight percent mineral oil having a viscosity of about 200 to about 1,200 (col. 12, lines 19–21).

Sieverding's triblock copolymers are SEBS copolymers, such as those sold by Shell Chemical Company of Houston, Tex. as KRATON® G1651 (col. 12, lines 38–40 and Table, col. 16, line 1 to col. 20, line 42). Sieverding's most preferred high molecular weight SEBS has a styrene to rubber ratio (S:EB or A:B) of about 0.48 to about 0.52 (i.e., about 48:52 to about 52:48)(col. 12, lines 40–45).

Sieverding's preferred tackifying resins are low molecular weight resins commercially available under the trade names REGALREZ® 1018 and 1033, both of which are manufactured by Hercules Incorporated of Wilmington, Del. (col. 13, lines 23, 31–33). The '193 patent states that the REGALREZ® resins desired for use in that material are liquid at room temperature (col. 3, lines 50–52). Sieverding's most preferred resin, REGALREZ® 1018, has an average molecular weight in the range of about 375 to about 430 (col. 13, lines 34–37). The Sieverding '193 patent also teaches the use of a single type of tackifying resin in high concentration in his materials (col. 13, lines 40–55).

The '193 patent does not disclose the tensile strength of the materials described therein. Because Sieverding's preferred triblock copolymers are SEBS copolymers, Applicant believes that the tensile strength of the materials of the '193 patent are low. This is because Applicant has found SEBS to be significantly inferior to his preferred polystyrene-hydrogenated poly(isoprene+butadiene)-polystyrene (S-(I+B)-S or S-(B+I)-S) copolymers. In some uses of his material, Sieverding prefers the use of mineral oil in addition to REGALREZ® 1018, which significantly decreases the visco-elastic properties of the materials. Further, Applicant also believes that Sieverding's material is inadequate for many cushioning and other applications since he prefers to use only one type of tackifying resin (Table, col. 15, line 49 to col. 20, line 43) and because of the narrow softening point ranges of tackifying resins useful in his material (col. 13, lines 40–55). In other words, various characteristics of Sieverding's material, including but not limited to softness and rebound rate, cannot be tailored for any given elastomer to plasticizer ratio. This may not be important in the field of adhesives, but it makes Sieverding's material impractical for wide application in the cushioning art.

B. Chemistry of Plasticizer-Extended Elastomers.

A basic discussion of the chemical principles underlying the characteristics and performance of plasticizer-extended elastomers is provided below to orient the reader for the later discussion of the particular chemical aspects of the invention.

The materials of the present invention are a composition primarily of triblock copolymers and plasticizers, both of which are commonly referred to as hydrocarbons. Hydrocarbons are elements which are made up mainly of Carbon (C) and Hydrogen (H) atoms. Examples of hydrocarbons include gasoline, oil, plastic and other petroleum derivatives.

Referring to FIG. 1a, it can be seen that a carbon atom 110 typically has four covalent bonding sites "•". FIG. 1b shows a hydrogen atom 112, which has only one covalent bonding site •. With reference to FIG. 1c, which represents a four-carbon molecule called butane, a "covalent" bond, represented at 116 as "-", is basically a very strong attraction between adjacent atoms. More specifically, a covalent bond is the linkage of two atoms by the sharing of two electrons, one contributed by each of the atoms. For example, the first carbon atom 118 of a butane molecule 114 shares an electron with each of three hydrogen atoms 120, 122 and 124, represented as covalent bonds 121, 123 and 125, respectively, accounting for three of carbon atom 118's available electrons. The final electron is shared with the second carbon atom 126, forming covalent bond 127. When atoms are covalently bound to one another, the atom-to-atom covalent bond combination makes up a molecule such as butane 114. An understanding of hydrocarbons, the atoms that make hydrocarbons and the bonds that connect those atoms is important because it provides a basis for understanding the structure and interaction of each of the components of the present invention.

As mentioned above, the present invention utilizes triblock copolymers. With reference to FIGS. 2a and 2b, a triblock copolymer is shown. Triblock copolymers 210 are so named because they each have three blocks—two endblocks 212 and 214 and a midblock 216. If it were possible to grasp the ends of a triblock copolymer molecule and stretch them apart, each triblock copolymer would have a string-like appearance (as in FIG. 2a), with an endblock being located at each end and the midblock between the two endblocks.

FIG. 3a depicts the preferred endblocks of the copolymer used in the present invention, which are known as monoalkenylarene polymers 310. Breaking the term "monoalkenylarene" into its component parts is helpful in understanding the structure and function of the endblocks. "Aryl" refers to what is known as an aromatic ring bonded to another hydrocarbon group. Referring now to FIG. 3b, benzene 312, one type of aromatic ring, is made up of six carbon molecules 314, 316, 318, 320, 322 and 324 bound together in a ring-like formation. Due to the ring structure, each of the carbon atoms is bound to two adjacent carbon atoms. This is possible because each carbon atom has four bonding sites. In addition, each carbon atom C of a benzene molecule is bound to only one hydrogen atom H. The remaining bonding site on each carbon atom C is used up in a double covalent bond 326, 327, which is referred to as a double bond. Because each carbon atom has only four bonding sites, double bonding in an aromatic ring occurs between a first carbon and only one of the two adjacent carbons. Thus, single bonds 116 and double bonds 326 alternate around the benzene molecule 312. With reference to FIG. 3c, in an aryl group 328, one of the carbons 330 is not bound to a hydrogen atom, which frees up a bonding site R for the aryl group to bond to an atom or group other than a hydrogen atom.

Turning now to FIG. 3d, "alkenyl" 332 refers to a hydrocarbon group made up of only carbon and hydrogen atoms, wherein at least one of the carbon-to-carbon bonds is a double bond 334 and the hydrocarbon group is connected to another group of atoms R', where R' represents the remainder of the hydrocarbon molecule and can include a single hydrogen atom. Specifically, the "en" signifies that a double bond is present between at least one pair of carbons. The "yl" means that the hydrocarbon is attached to another group of atoms. For example, FIG. 3e shows a two carbon group having a double bond between the carbons, which is called ethenyl 336. Similarly, FIG. 3f illustrates a three carbon group having a double bond between two of the carbons, which is called propenyl 338. Referring again to FIG. 3a, in a monoalkenylarene such as styrene, a carbon 340 of an alkenyl group 332 is bonded to the aryl group 328 at carbon atom 330, which has a free bonding site. In reference to FIG. 3c, aryl group 328 is part of a monoalkenylarene molecule when R is an alkenyl group. The "mono" of monoalkenylarene explains that only one alkenyl group is bonded to the aryl group.

The monoalkenylarene end blocks of a triblock copolymer are polymerized. Polymerization is the process whereby monomers are connected in a chain-like fashion to form a polymer. FIG. 4a depicts a polymer 410, which is basically a large chain-like molecule formed from many repeating smaller molecules, called monomers, M1, M2, M3, etc., that are bonded together. P and P' represent the ends of the polymer, which are also made up of monomers. In the present invention, illustrated by FIG. 4b, a monoalkenylarene end block polymer 414 is a chain of monoalkenylarene molecules 416a, 416b, 416c, etc. The chain of FIG. 4b is spiral, or helical, in shape due to the bonding angles between styrene molecules. P represents an extension of the endblock polymer helix in one direction, while P' represents an extension of the endblock polymer helix in the opposite direction.

As FIG. 4c shows, monoalkenylarene molecules are attracted to one another by a force that is weaker than covalent bonding. The primary weak attraction between monoalkenylarene molecules is known as hydrophobic attraction. An example of hydrophobic attraction is the attraction of oil droplets to each other when dispersed in water. Therefore, in its natural, relaxed state at room temperature, a monoalkenylarene polymer resembles a mass of entangled string 414, as depicted in FIG. 4d. The attraction of monoalkenylarene molecules to one another creates a tendency for the endblocks to remain in an entangled state. Similarly, different monoalkenylarene polymers are attracted to each other. The importance of this phenomenon will become apparent later in this discussion.

Like the end blocks of a triblock copolymer, the midblock is also a polymer. In the invention, the preferred triblock copolymer midblock is an aliphatic hydrocarbon. Traditionally, "aliphatic" meant that a hydrocarbon was "fat like" in its chemical behavior. Referring to FIGS. 5a through 5c, which do not show the hydrogen atoms for simplicity, an "aliphatic compound" is now defined as a hydrocarbon compound which reacts like an alkane 510 (a hydrocarbon molecule having only single bonds between the carbon atoms), an alkene 512 (a hydrocarbon molecule wherein at least one of the carbon-to-carbon bonds is a double bond), 514 an alkyne (a hydrocarbon molecule having a triple covalent bond 515 between at least one pair of carbon atoms), or a derivative of one of the above.

Referring now to FIG. 5d, which omits the bound hydrogen atoms for simplicity, aliphatic hydrocarbons known as conjugated dienes 516 are depicted. These are the preferred midblock monomers used in the triblock copolymers of the present invention. A "diene" is a hydrocarbon molecule having two ("di") double bonds ("ene"). "Conjugated" means that the double bonds 518 and 520 are separated by only one single carbon-to-carbon bond 522. In comparison, FIG. 5e shows a hydrocarbon molecule having two double carbon-to-carbon bonds that are separated by two or more single bonds, 530, 532, etc., which is referred to as an "isolated diene" 524. When double bonds are conjugated, they interact with each other, providing greater stability to a hydrocarbon molecule than would the two double bonds of an isolated diene.

FIGS. 6a through 6d illustrate examples of various monomers useful in the midblock of the present invention, including molecules (monomers) such as ethylene-butylene (EB) 612, ethylene-propylene (EP) 614, butadiene (B) 616 and isoprene (I) 618. Midblocks containing isoprene and/or butadiene monomers are useful in the material of the invention in either the hydrogenated or the non-hydrogenated form. The different structures of these molecules provide them with different physical characteristics, such as differing strengths of covalent bonds between adjacent monomers. The various structures of monomer molecules also provides for different types of interaction between distant monomers on the same chain (e.g., when the midblock chain folds back on itself, distant monomers may be attracted to one another by a force weaker than covalent bonding, such as hydrophobic interaction, hydrophilic interaction, polar forces or Vander Waals forces).

Referring to FIGS. 6a and 6b, x, y and n each represent an integral number of each bracketed unit: "x" is the number of repeating ethylene (—CH2—CH2—) units, "y" is the number of repeating butylene (in FIG. 6a) or propylene (in FIG. 6b) units, and "n" is the number of repeating poly (ethylene/butylene) units. Numerous configurations are possible.

As shown in FIGS. 7a through 7d, the midblock may contain (i) only one type of monomer, EB, EP, B or I or, as FIGS. 7e and 7f illustrate, (ii) a combination of monomer types EB and EP or B and I, providing for wide variability in the physical characteristics of different midblocks made from different types or combination of types of monomers. The interaction of physical characteristics of each molecule (monomer and block) determines the physical characteristics of the tangible, visible material. In other words, the type or types of monomer molecules which make up the midblock polymer play a role in determining various characteristics of the material of which the midblock is a part.

Attributes such as strength, elongation, elasticity or visco-elasticity, softness, tackiness and plasticizer retention are, in part, determined by the type or types of midblock monomers. For example, referring again to FIG. 7a, the midblock polymer 216 of a triblock copolymer-containing material may be made up primarily or solely of ethylene-butylene monomers EB, which contribute to that material's physical character. With reference to FIG. 7e, in comparison to the material having a midblock made up solely of EB, a similar triblock-containing material, wherein the midblock polymer 216 (either hydrogenated or non-hydrogenated) of the triblocks are made up of a combination of butadiene B and isoprene I monomers, may have greatly increased strength and elongation, similar elasticity or visco-elasticity and softness, and reduced tackiness and reduced plasticizer bleed.

The monomer units of the midblock have an affinity for each other. However, the hydrophobic attraction of the midblock monomers for each other is much weaker than the non-covalent attraction of the end block monomers for one another.

Referring now to FIG. 8a, which shows a polystyrene-poly(isoprene+butadiene)-polystyrene triblock copolymer, in a complete triblock copolymer 810, each end 812 and 814 of midblock chain 216 is covalently bound to an end block 212 and 214. P and P" represent the remainder of the endblock polymers 212 and 214 respectively. P' represents the central portion of midblock polymer 216. Many billions of triblock copolymers combine to form a tangible material. The triblock copolymers are held together by the high affinity (i.e., hydrophobic attraction) that monoalkenylarene molecules have for one another. In other words, as FIG. 8b illustrates, the endblocks of each triblock copolymer molecule, each of which resemble an entangled mass of string 414, are attracted to the endblocks of another triblock copolymer. When several endblocks are attracted to each other, they form an accretion of endblocks, called a domain or a glassy center 816. Agglomeration of the endblocks occurs in a random fashion, which results in a three-dimensional network 818 of triblocks, the midblock 216 of each connecting endblocks 212 and 214 located at two different domains 816a and 816b. In addition to holding the material together, the domains of triblock copolymers also provide it with strength and rigidity.

Plasticizers are generally incorporated into a material to increase the workability, pliability and flexibility of that material. Incorporation of plasticizers into a material is known as plasticization. Chemically, plasticizers are hydrocarbon molecules which associate with the material into which they are incorporated, as represented in FIG. 9a. In the present invention, plasticizer molecules 910 associate with the triblock copolymer 210, and increase its workability, softness, elongation and elasticity or visco-elasticity. Depending upon the type of plasticizer used, the plasticizer molecules associate with either the endblocks, the midblock, or both. For reasons that will soon become apparent, Applicant prefers plasticizers 910 which associate primarily with midblock polymer 216 of triblock copolymer 818, rather than with the end blocks.

Chemists have proposed four general theories to explain the effects that plasticizers have on certain materials. These theories are known as the lubricity theory, the gel theory, the mechanistic theory and the free volume theory.

The lubricity theory, illustrated in FIGS. 9b through 9d, assumes that the rigidity of a material (i.e., its resistance to deformation) is caused by intermolecular friction. Under this theory, plasticizer 910 lubricates the large molecules, facilitating movement of those molecules over each other. See generally, Jacqueline I. Kroschwitz, ed., CONCISE ENCYCLOPEDIA OF POLYMER SCIENCE AND ENGINEERING 734–44, *Plasticizers* (1990), which is hereby incorporated by reference. In the case of triblock copolymers, lubrication of the endblocks should be avoided since the endblock domains are responsible for holding the triblock copolymers together and provide the material with strength (e.g., tensile strength during elongation). Thus, a plasticizer which associates with the midblocks is preferred. According to the lubricity theory, when manipulative force is exerted on the material, plasticizer 910 facilitates movement of midblocks 216 past each other. Id. at 734–35. The arrows in the Figures represent the motion of midblocks 216 with respect to each other. FIG. 9b represents adjacent midblocks being pulled away from each other. FIG. 9c represents two midblocks being forced side-to-side. FIG. 9d represents adjacent midblocks being pulled across one another.

FIGS. 9e and 9f depict a second plasticization theory, the gel theory, which reasons that the resistance of amorphous polymers to deformation results from an internal, three-dimensional honeycomb structure or gel. Loose attachments between adjacent polymer chains, which occur at intervals along the chains, called attachment points, form the gel. Closer attachment between adjacent chains creates a stiffer and more brittle material. Plasticizers 910 break, or solvate, the points of attachment 914 between polymer chains, loosening the structure of the material. Thus, plasticizers produce about the same effect on a material as if there were fewer attachment points between polymer chains, making the material softer or less brittle. See Id. at 735. Since one of the purposes of the present invention is to provide a material with improved tensile strength, which is provided by agglomeration of the endblocks, according to the gel theory plasticizer 910 should associate with midblocks 216 rather than with the endblocks. Further, a plasticizer which associates with the midblock polymers decreases the attachment of adjacent midblocks, which likely decreases the rigidity while increasing the pliability, elongation and elasticity or visco-elasticity of the material. Similar to the lubricity theory, under the gel theory, reduction of attachment points between adjacent midblocks facilitates movement of the midblocks past one another as force is applied to the material.

Referring now to FIG. 9g, the mechanistic theory of plasticization assumes that different types of plasticizers 910, 912, etc. are attracted to polymer chains by forces of different magnitudes. In addition, the mechanistic theory supposes that, rather than attach permanently, a plasticizer attaches to a given attachment point only to be later dislodged and replaced by another. This continuous exchange of plasticizers 910, 912, etc., demonstrated by the Figure as different stages connected by arrows which represent an equilibrium between each stage, is known as a dynamic equilibrium between solvation and desolvation of attachment points between adjacent polymer chains. The number or fraction of attachment points affected by a plasticizer depends upon various conditions, such as plasticizer concentration, temperature, and pressure. See Id. Accordingly, as applied to the material of this invention, a large amount of plasticizer would be necessary to affect the majority of midblock attachment points and thus provide the desired amounts of rigidity, softness, pliability, elongation and elasticity or visco-elasticity.

With reference to FIGS. 9h through 9j, the fourth plasticization theory, known as the free volume theory, assumes that there is nothing but free space between molecules. As molecular motion increases (e.g., due to heat), the free space between molecules increases. Thus, a disproportionate amount of that free volume is associated with the ends of the polymer chains. As FIGS. 9h through 9j demonstrate, free volume is increased by using polymers with shorter chain lengths. For example, the black rectangles of FIG. 9h represent a material made up of long midblock polymers 216. The white areas around each black rectangle represent a constant width of free space around the molecule. In FIG. 9i, a molecule 916, which is smaller than midblock 216, is added to the material, creating more free space. In FIG. 9j, an even smaller molecule 918 has been added to the material. The increase in free space within the material is evident from the increased area of white space. The crux of the free volume theory is that the increase in free space or volume allows the molecules to more easily move past one another. In other words, the use of a small (or low molecular weight) plasticizer increases the ability of the midblock polymer chains to move past each other. While the Figures provide a fair representation of the free volume theory, in reality, the increase in free space would be much greater since molecules are three-dimensional structures.

Similarly, the use of polymers with flexible side chains create additional free volume around the molecule, which produces a similar plasticization-like effect, called internal plasticization. Applicant believes that incorporation of monomers into the midblock, which create flexible side chains thereon, including but not limited to isoprene and ethylene/propylene monomers, creates internal plasticization. In comparision, the addition of an even smaller plasticizer molecule, described above, increases the free space at a given location; this is external plasticization. The size and shape of plasticizing molecule and the nature of its atoms and groups of atoms (i.e., nonpolar, polar, hydrogen bonding or not, and dense or light) determines its plasticizing ability on a specific polymer. See Id.

A visco-elastic material which deforms under pressure and has a high level of memory is needed. A material is also needed which has a slow rebound rate. In particular, a visco-elastic material is needed which has a tailorable rebound rate. A material with variable adhesive properties and stiffness is also needed.

With this general background in mind, Applicant will explain the formulation, chemical structure and performance of the invention.

III. SUMMARY OF THE INVENTION

It is an object of the invention to provide podalic pads which are soft and deformable. The invented pads utilize a material that readily conforms to the shape of a wearer's foot.

It is an object of the invention to provide podalic pads which are durable and long-lasting. The molecular composition used in the preferred embodiment of the invention has shown excellent wear characteristics and has a high tensile strength.

The visco-elastic material of the present invention is a composite which includes an elastomer component which includes at least one elastomeric polymer and plasticizer. Applicant prefers using triblock copolymers having the general configuration A-B-A as at least one of the elastomeric polymers. The elastomer component makes up from about one weight percent to about thirty weight percent of the material. Preferably, the elastomer component comprises about one weight percent to about fifteen weight percent of the material. Most preferably, the materials of this invention include about one weight percent to about five weight percent elastomeric polymer, the weight percentages being based upon the total weight of the material.

The plasticizer component may contain one type of plasticizer or a mixture of plasticizer types. In plasticizer mixtures useful in the present invention, resins comprise the weight majority of the plasticizer component. Preferably, the plasticizer component is made up solely of resin (i.e., no oils). The materials of the invention include about 70 to about 99 weight percent plasticizer component, based upon the total weight of the material. Preferably, the materials of the invention include about 85 to about 99 weight percent plasticizer. Most preferably, the materials of the invention are made up of about 95 to about 99 weight percent plasticizer.

The visco-elastic material of the present invention deforms readily under pressure. The use of plasticizing resins in combination with A-B-A triblock copolymers creates a material which deforms under pressure. Thus, the material of the invention equalizes load bearing pressure against a cushioned object. The firmness or stiffness and rebound rate of the material of this invention are tailorable, in part, due to the physical characteristics of different plasticizers (i.e., factors such as molecular weight, specific gravity and $T_g$).

Following deformation, the materials of the present invention rebound to substantially their original shape. The use of A-B-A triblock copolymer provides a great deal of elasticity to the material of the invention.

The preferred material of the present invention is highly visco-elastic and has a generally slow rebound rate. In fact, the preferred material of the invention rebounds to its original shape in times of more than about one second. Plasticizing resins contribute visco-elasticity and delayed rebound to the material. The amount of visco-elasticity and rebound rate vary, depending partially upon the type or types of resins used. Thus, the rebound rate of the material of the invention may be tailored.

Similarly, the adhesive properties of the materials of the invention may be tailored for specific uses. Once again, the adhesive characteristics of the visco-elastic material depend, primarily, upon the amount and type or types of resins used in the invention.

Upon reading the appended specification, claims and drawings, these and other objects, features and advantages of the present invention will become apparent to persons of ordinary skill in the art.

IV. BRIEF DESCRIPTION OF THE DRAWINGS

FIG. 4a illustrates a midblock(B) of the triblock copolymer of FIG. 2a.

FIG. 4b illustrates an endblock(A) of the triblock copolymer of FIG. 2a.

FIG. 4c illustrates the weak bonding between the monomer units of one or more midblocks(B) of the triblock copolymer of FIG. 2a.

FIG. 4d illustrates an endblock(A) of the triblock copolymer of FIG. 2a, showing the endblock in a relaxed state.

FIG. 10 depicts a perspective view of a bicycle seat made from materials according to the present invention, showing a cutaway view of the cover.

FIG. 11 depicts a cross-sectional view at line 11—11 from FIG. 10 of a bicycle seat made from the materials of the present invention.

V. DETAILED DESCRIPTION OF THE PREFERRED EMBODIMENTS

A. Definitions

1. Visco-Elasticity

Figure 1A:
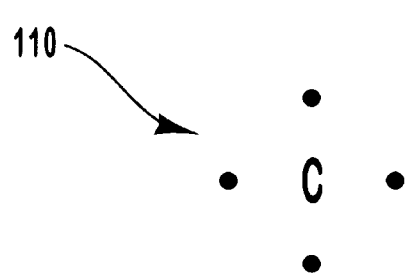
FIG. 1a illustrates a carbon atom and its covalent bonding sites.
Figure 1B:
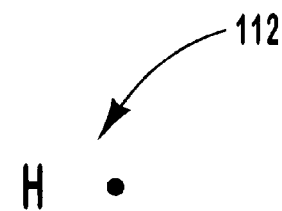
FIG. 1b illustrates a hydrogen atom and its covalent bonding site.
Figure 1C:
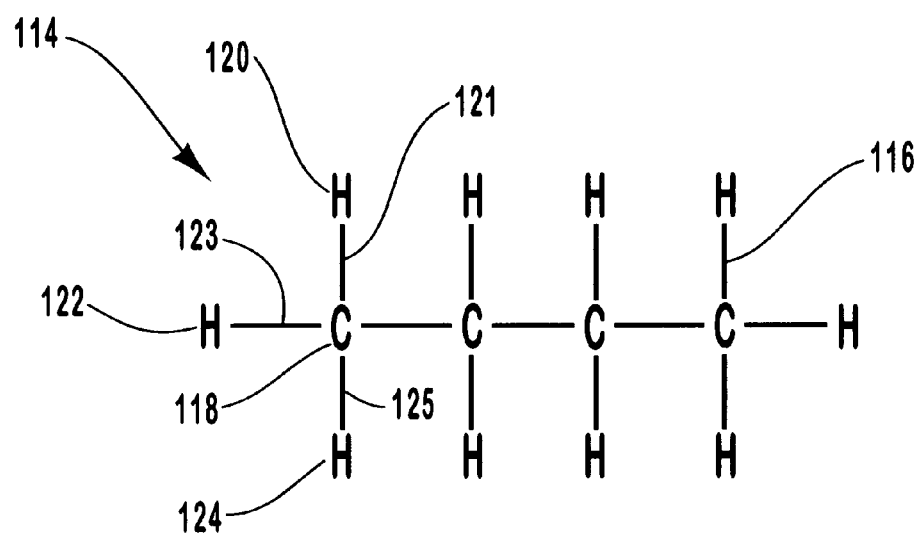
FIG. 1c illustrates a four carbon hydro-carbon molecule known as butane.
Figure 2A:
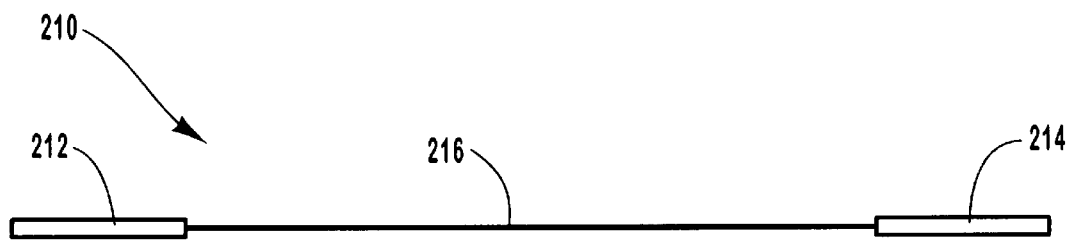
FIG. 2a illustrates a triblock copolymer useful in the present invention.
Figure 2B:
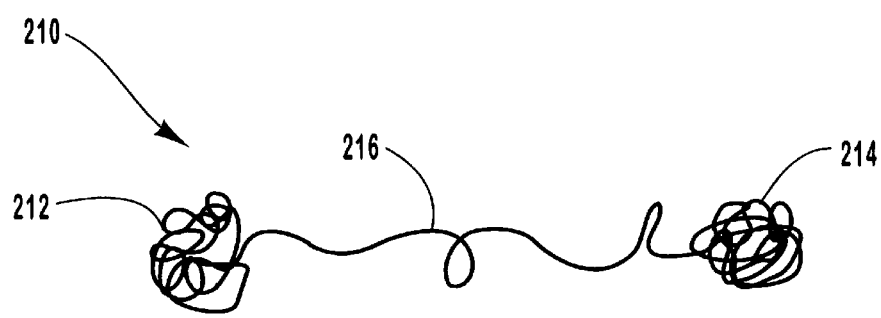
FIG. 2b shows the triblock copolymer of FIG. 2a in a relaxed state.
Figure 3A:
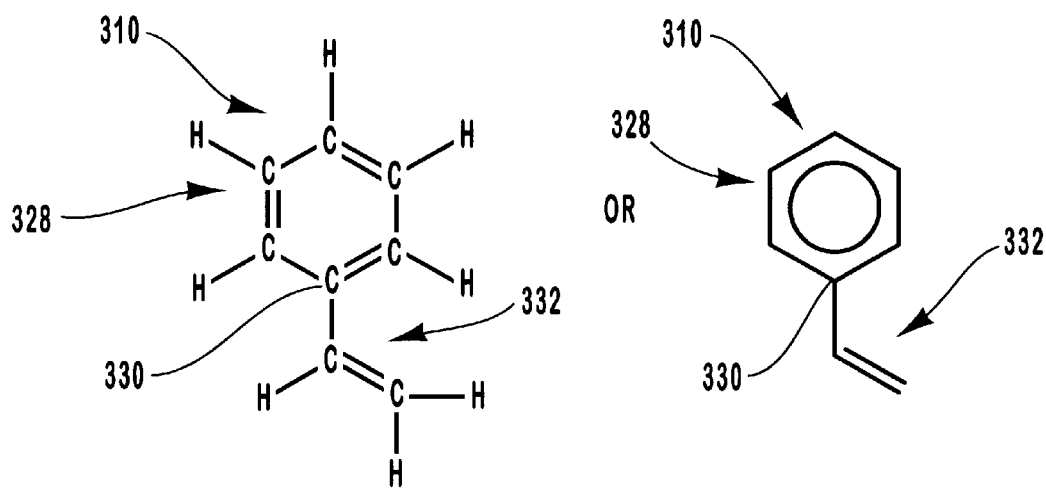
FIG. 3a illustrates the chemical structure of a stryene molecule.
Figure 3B:
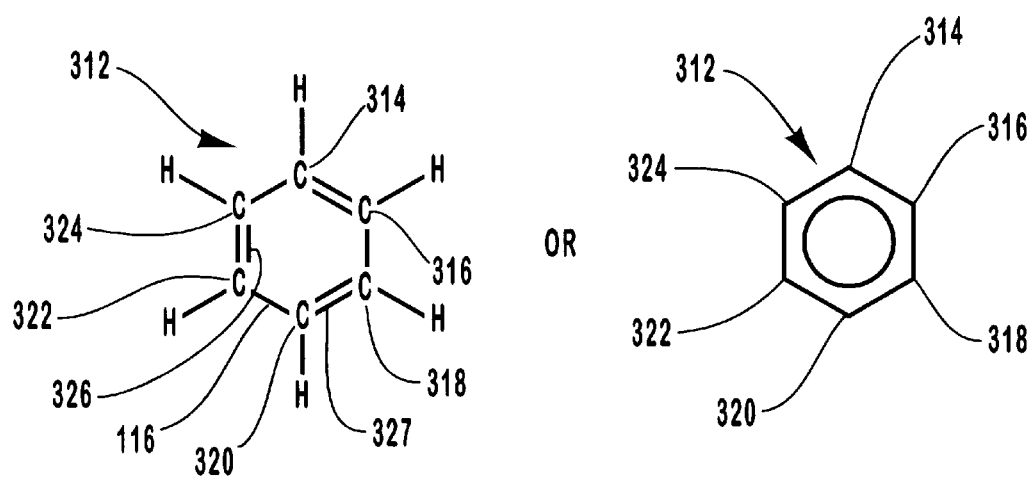
FIG. 3b illustrates the chemical structure of a benzene molecule.
Figure 3C:
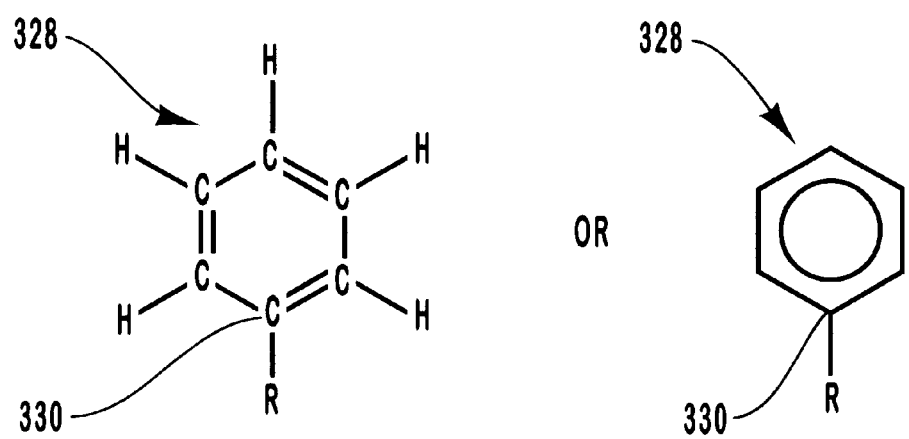
FIG. 3c illustrates the chemical structure of an aryl group.
Figure 3D:
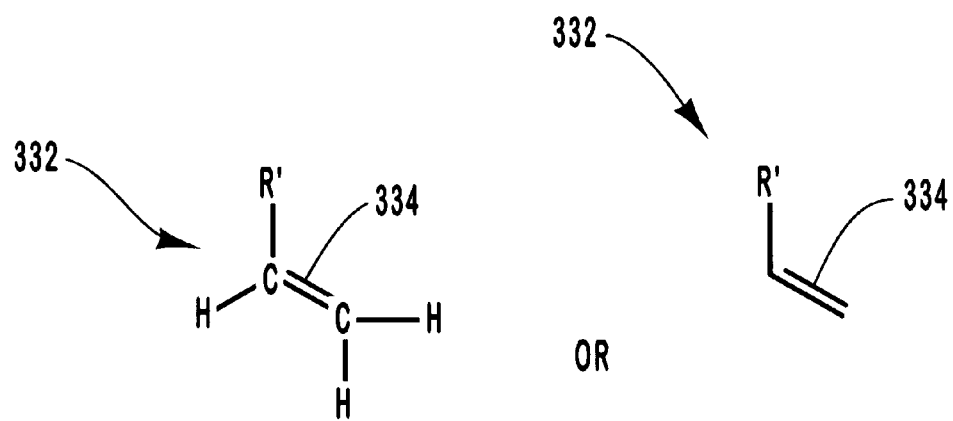
FIG. 3d illustrates the chemical structure of an -enyl group.
Figure 3E:
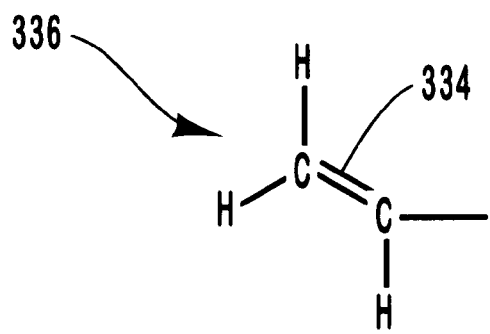
FIG. 3e illustrates the chemical structure of an ethenyl group.
Figure 3F:
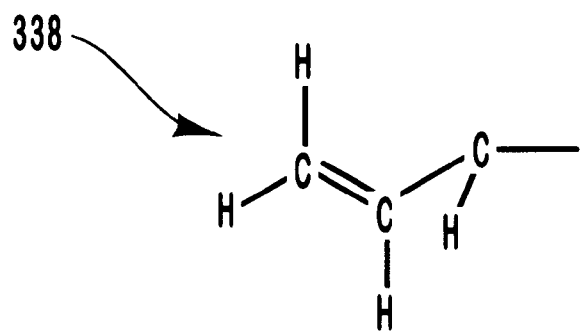
FIG. 3f illustrates the chemical structure of a propenyl group.
Figure 5A:
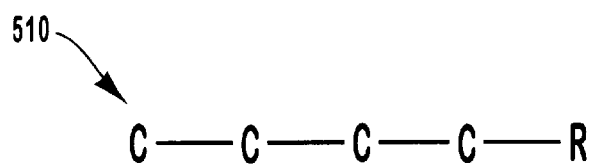
FIG. 5a illustrates the chemical structure of hydrocarbon molecules known as alkanes.
Figure 5B:
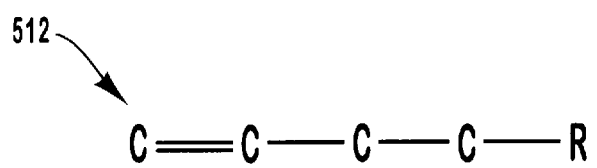
FIG. 5b illustrates the chemical structure of hydrocarbon molecules known as alkenes.
Figure 5C:
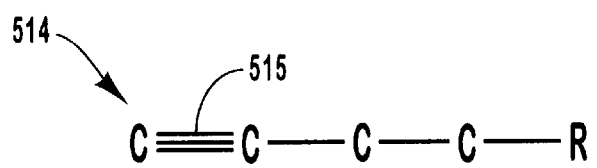
FIG. 5c illustrates the chemical structure of hydrocarbon molecules known as alkynes.
Figure 5D:
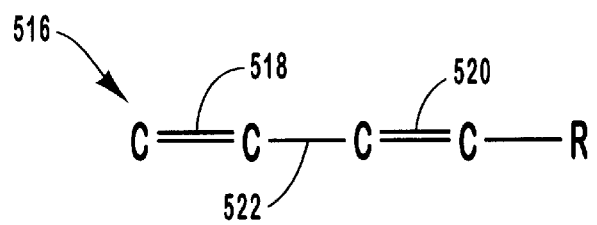
FIG. 5d illustrates the chemical structure of a hydrocarbon molecule known as a conjugated diene.
Figure 5E:
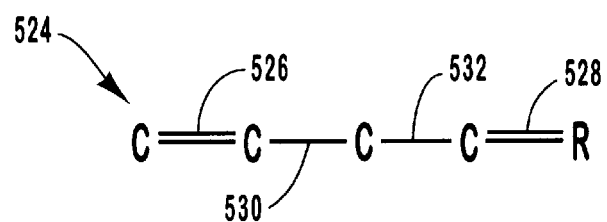
FIG. 5e illustrates the chemical structure of a hydrocarbon molecule known as an isolated diene.
Figure 6A:
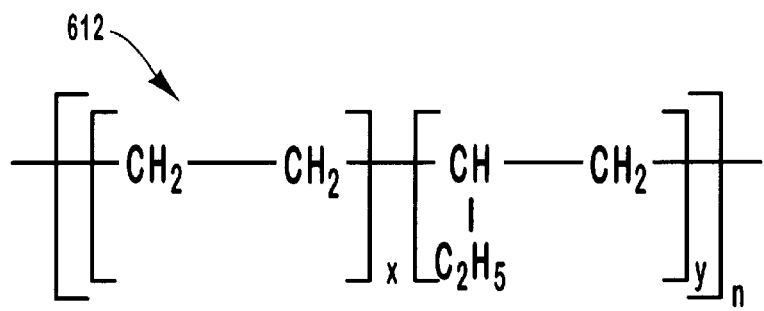
FIG. 6a illustrates the chemical structure of a poly (ethylene/butylene) molecule.
Figure 6B:
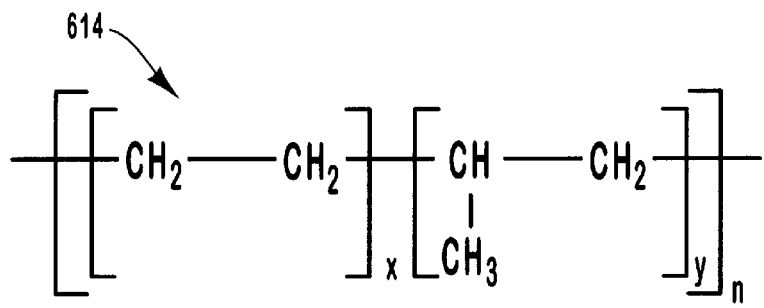
FIG. 6b illustrates the chemical structure of a poly (ethylene/propylene) molecule.
Figure 6C:
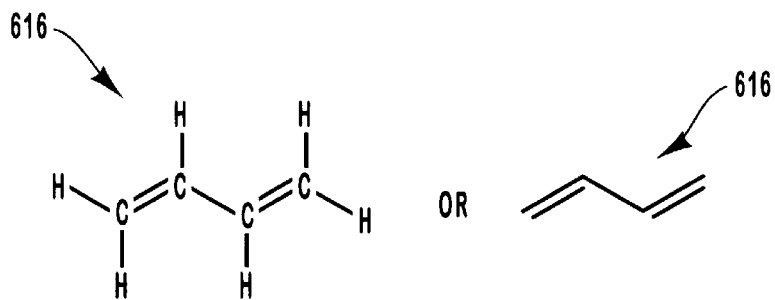
FIG. 6c illustrates the chemical structure of a 1,3-butadiene molecule.
Figure 6D:
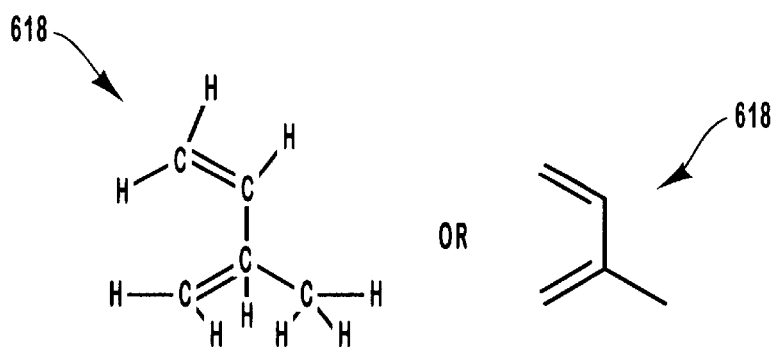
FIG. 6d illustrates the chemical structure of an isoprene molecule.
Figure 7A:
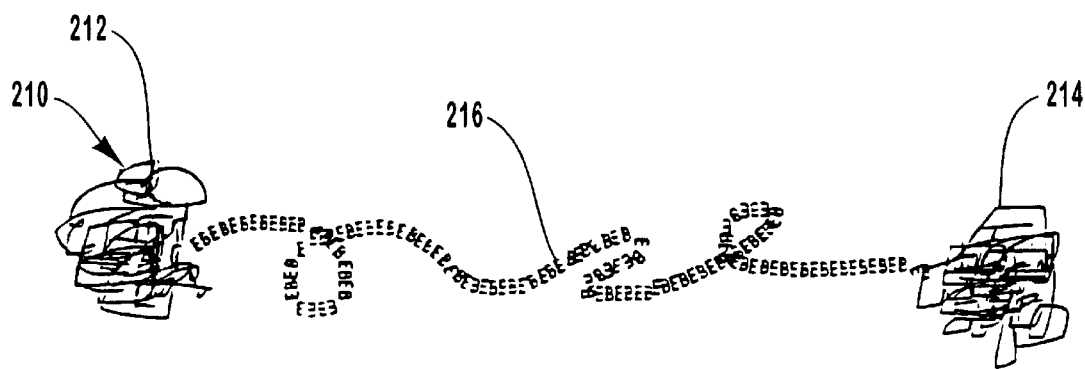
FIG. 7a illustrates polystyrene-poly(ethylene/butylene)-polystyrene.
Figure 7B:
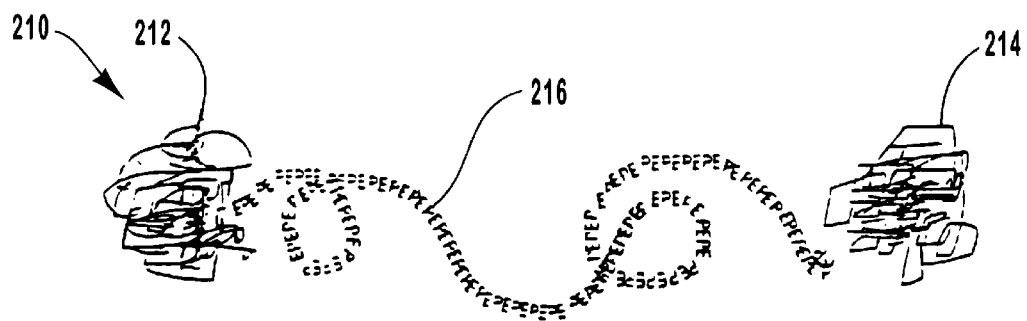
FIG. 7b illustrates polystyrene-poly(ethylene/propylene)-polystyrene.
Figure 7C:
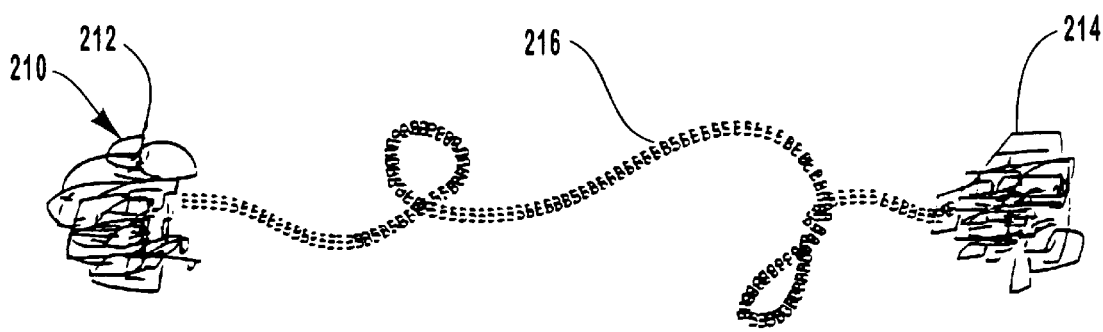
FIG. 7c illustrates polystyrene-polybutadiene-polystyrene.
Figure 7D:
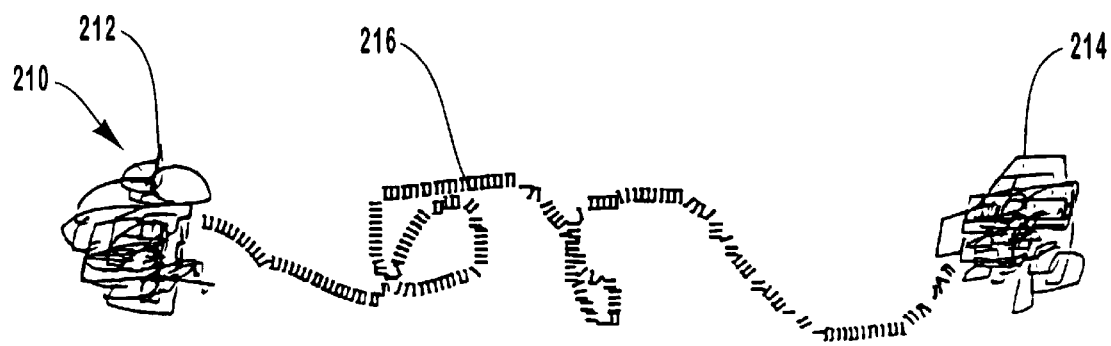
FIG. 7d illustrates polystyrene-polyisoprene-polystyrene.
Figure 7E:
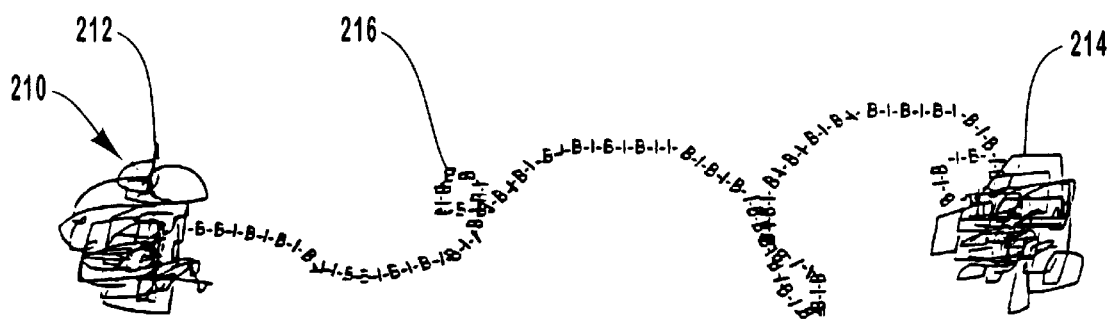
FIG. 7e illustrates polystyrene-poly(butadiene+isoprene)-polystyrene.
Figure 7F:
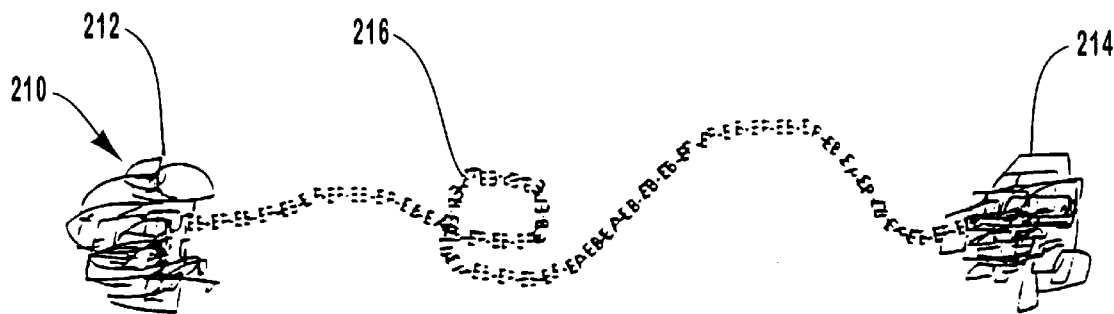
FIG. 7f illustrates polystyrene-poly(ethylene/butylene+ethylene/propylene)-polystyrene.
Figure 8A:
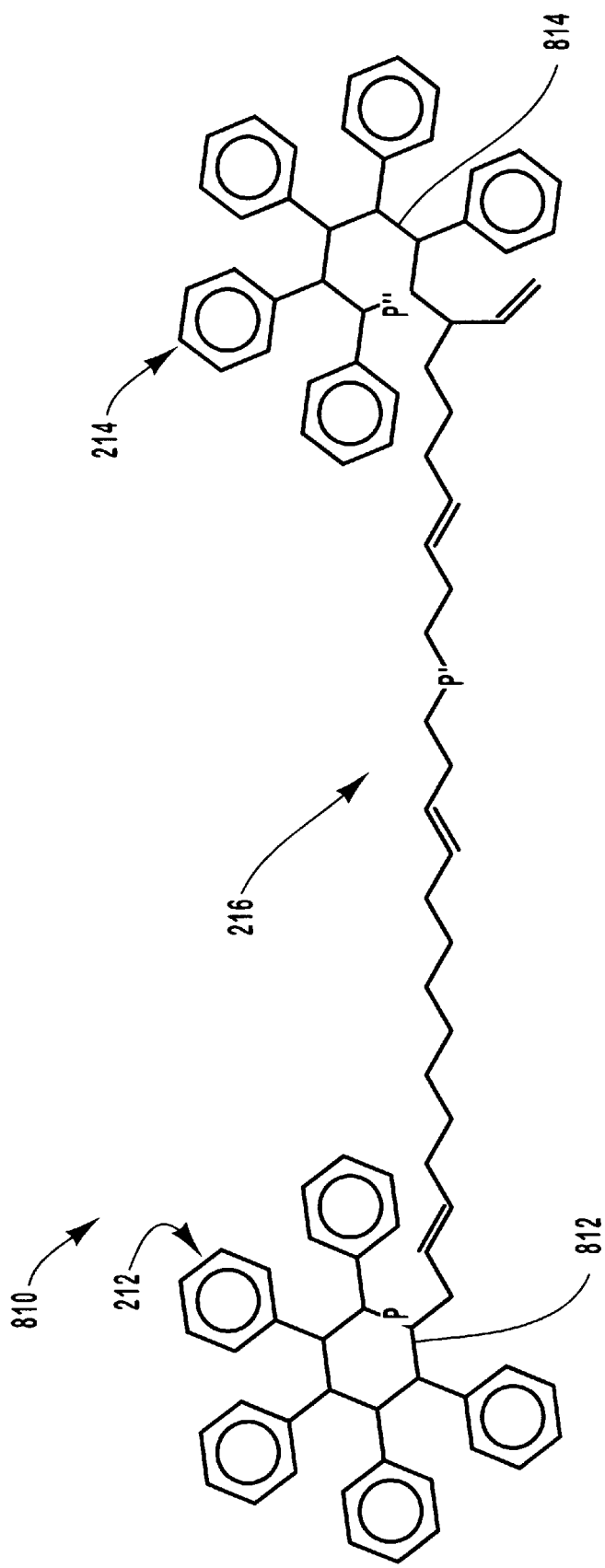
FIG. 8a illustrates the chemical structure of polystyrene-poly(ethylene/butylene+ethylene/propylene)-polystyrene.
Figure 8B:
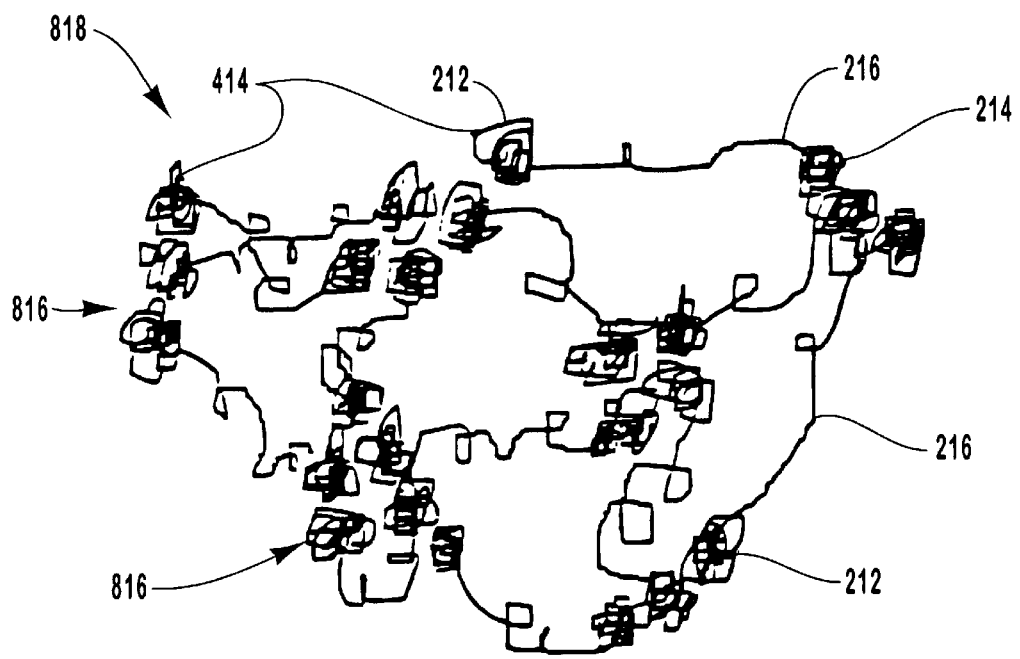
FIG. 8b illustrates a group of the triblock copolymers of FIG. 2a, showing weak attraction of the endblocks to each other.
Figure 9A:
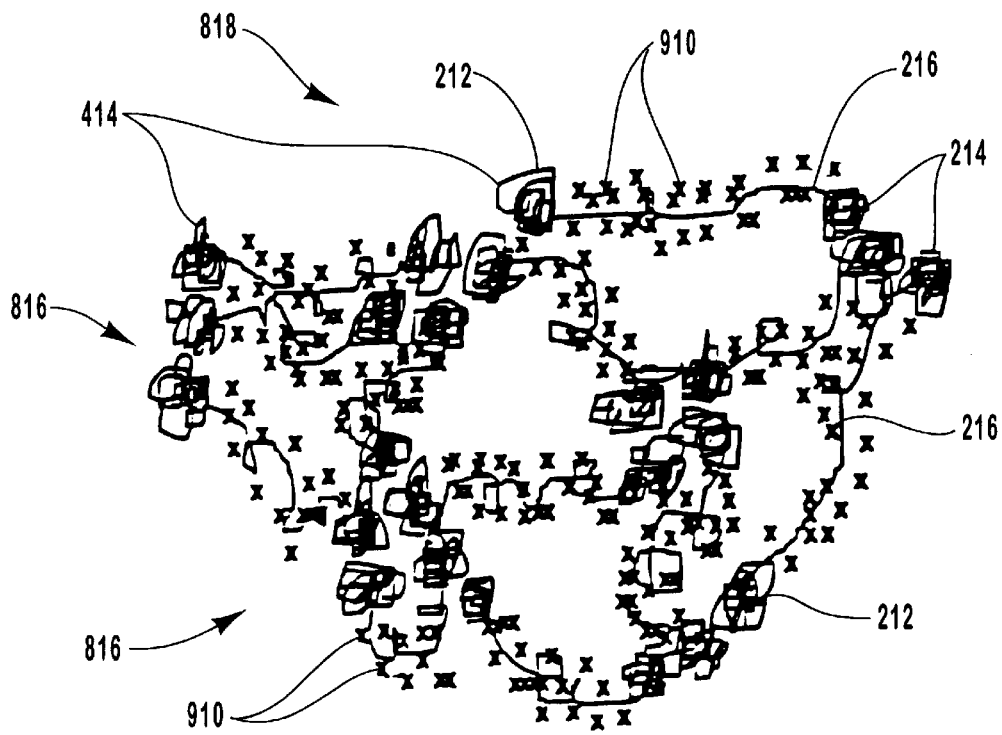
FIG. 9a illustrates plasticizer association with the group of triblock copolymers of FIG. 8b according to a preferred embodiment of the present invention.
Figure 9B:
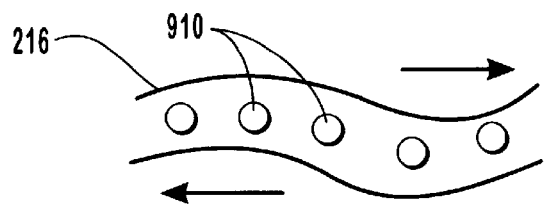
FIG. 9b illustrates the lubricity theory of plasticization, showing two midblocks (B) moving away from each other.
Figure 9C:
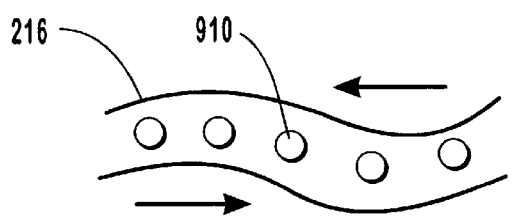
FIG. 9c illustrates the lubricity theory of plasticization, showing two midblocks (B) moving toward each other.
Figure 9D:
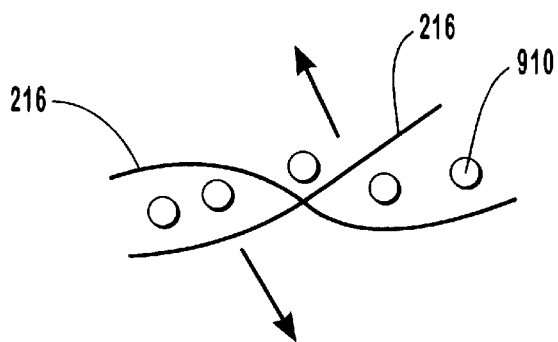
FIG. 9d illustrates the lubricity theory of plasticization, showing two midblocks (B) moving across each other.
Figure 9E:
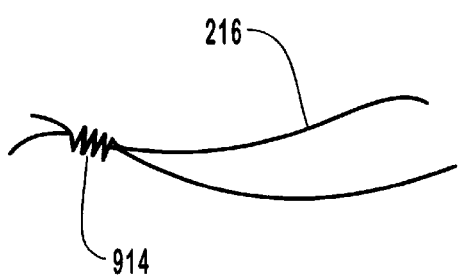
FIG. 9e illustrates the gel theory of plasticization, showing a weak attraction between two midblocks (B) when plasticizer is not present.
Figure 9F:
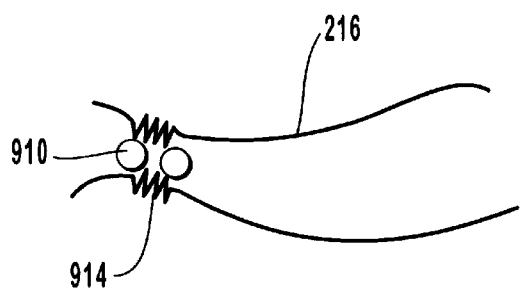
FIG. 9f illustrates the gel theory of plasticization, showing a plasticizer molecule breaking the weak attraction of FIG. 9e.
Figure 9G:
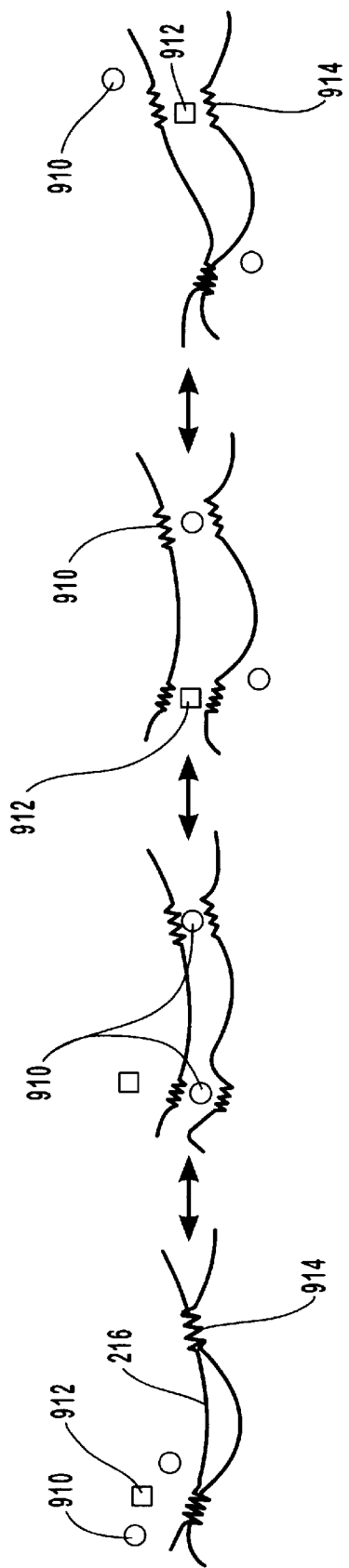
FIG. 9g illustrates the mechanistic theory of plasticization, showing an equilibrium of plasticizer breaking the weak attraction of midblocks (B) for each other.
Figure 9H:
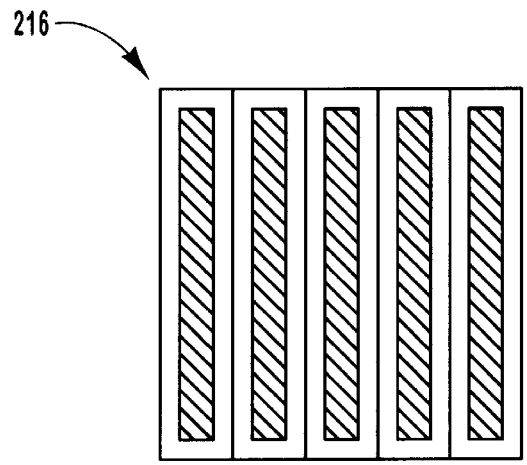
FIG. 9h illustrates the free volume theory of plasticization, showing the free space associated with a midblock (B).
Figure 9I:
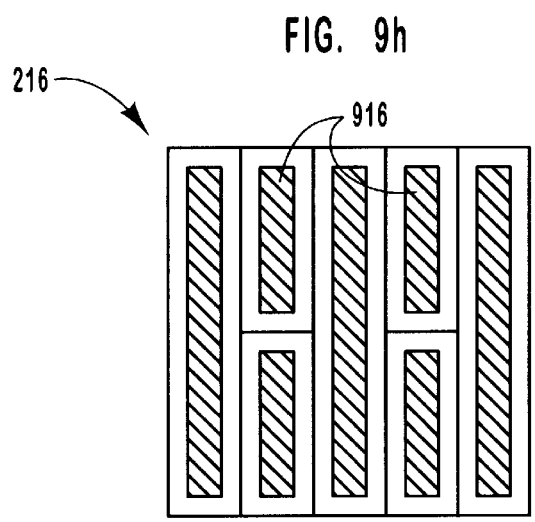
FIG. 9i illustrates the theory of FIG. 9h, showing that as smaller molecules are added, the free space in a given area increases.
Figure 9J:
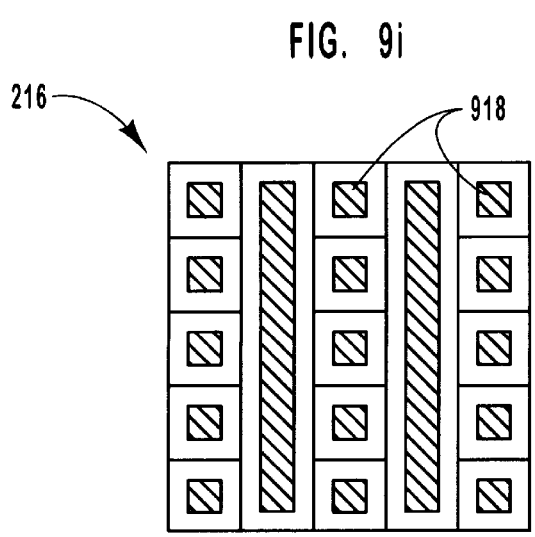
FIG. 9j illustrates the theory of FIG. 9h, showing that even smaller plasticizers provide an even greater amount of free space.

When finite strains are imposed upon visco-elastic materials, such as the materials of the preferred embodiments of the present invention, the stress-strain relations are much more complicated than those ordinarily anticipated in accordance with the classical theory of elasticity (Hooke's law) or the classical theory of hydrodynamics (Newton's law). According to Hooke's law, stress is always directly proportional to strain in small deformations but independent of the rate of strain or the strain history. Newton's law of hydrodynamics, which deals with the properties of viscous liquids, states that stress is always directly proportional to the rate of strain but independent of the strain itself.

"Elastic," as defined herein, refers to a characteristic of materials which return substantially to their original shape following deformation and the subsequent cessation of deforming force.

"Visco-," as defined herein, relates to both the rate of deformation and the rate of reformation. In reference to deformation rate, the faster a deforming force is applied to a visco-elastic material, the stiffer it is. The rate of reformation of a visco-elastic materials is slower than that of a truly elastic material.

Even if both strain and rate of strain are infinitesimal, a visco-elastic material may exhibit behavior that combines liquid-like and solid-like characteristics. For example, materials that exhibit not-quite-solid-like characteristics do not maintain a constant deformation under constant stress but deform, or creep, gradually over time. Under constant deformation, the stress required to hold a visco-elastic material in the deformed state gradually diminishes until it reaches a relatively steady state. On the other hand, a visco-elastic material that exhibits not-quite-liquid-like characteristics may, while flowing under constant stress, store some of the energy input instead of dissipating it all as heat. The stored energy may then cause the material to at least partially recover from its deformation, known as elastic recoil, when the stress is removed. When viscoelastic materials are subjected to sinusoidally oscillating stress, the strain is neither exactly in phase with the stress (as it would be for a perfectly elastic solid) nor 90° out of phase (as it would be for a perfectly viscous liquid) but is somewhere in between. Visco-elastic materials store and recover some of the deforming energy during each cycle, and dissipate some of the energy as heat. If the strain and rate of strain on a visco-elastic material are infinitesimal, the behavior of that material is linear viscoelastic and the ratio of stress to strain is a function of time (or frequency) alone, not of stress magnitude. The materials of the present invention are visco-elastic in nature.

"Rebound rate", as defined herein, is the amount of time it takes a one inch long piece of material to rebound to within about five percent of its original shape and size following the release of stress which elongates the material to a length of two inches. Preferably, the visco-elastic material of the present invention has a rebound rate of at least about one second. More preferably, the material of the invention has a rebound rate within the range of about one second to about ten minutes.

2. Resins

The term "resin" is defined herein as a solid or semisolid fusible, organic substance that is usually transparent or translucent, is soluble in organic solvent but not in water and is an electrical nonconductor. "Resin" includes tackifiers.

"Resinous" as used herein refers to resins and resin-like materials.

"Resinous plasticizers" as used herein refers to plasticizers which include a majority, by weight, of a resin.

"Tackifier" as used herein refers to resins that add tack to the resulting mixture. The primary function of a tackifier is to add tack. The secondary functions of tackifiers include the modification of the melt viscosity and the melt temperature of a material.

Tackifiers are normally low molecular weight and high $T_g$ materials, and are sometimes characterized as highly condensed acrylic structures. The most commonly used tackifiers are rosin derivatives, terpene resins, and synthetic or naturally derived petroleum resins. A tackifier's effectiveness is largely determined by its compatibility with the rubber component and by its ability to improve the tackiness of a material.

"Low molecular weight," as defined herein with reference to resins, means resins having a weight average molecular weight of less than about 50,000.

Resins and tackifiers are used in some preferred embodiments of the present invention.

3. Molecular Weight

"Number Average Molecular Weight" ($M_n$), as determined by gel permeation chromatography, provides information about the lower molecular weight parts of a hydrocarbon molecule.

"Weight Average Molecular Weight" ($M_w$), as determined by gel permeation chromatography, indicates the average molecular weight of a hydrocarbon molecule. This is the value that is commonly used in reference to the molecular weight of a hydrocarbon molecule.

"Z-Average Molecular Weight" ($M_z$), as determined by gel permeation chromatography is used as an indication of the high-molecular-weight portion of a hydrocarbon molecule. When the hydrocarbon molecule is a resin, the Z-average molecular weight indicates the compatibility and adhesive properties of that resin.

Molecular weight values may also be determined by any of several other methods, such as the Flory viscosity method, the Staudinger viscosity method, and light scattering in combination with high performance liquid chromatography.

4. Cloud Point Tests

The following values, which are determined by cloud point tests, are useful in determining the compatibility of a resin with different types of materials.

"MMAP," as defined herein, is a measurement of aromatic solubility and determines the aliphatic/aromatic character of a resin. The MMAP value is obtained by dissolving a resin in a high temperature mixture of one part methylcyclohexane and two parts aniline, and cooling the solution while mixing to determine the temperature at which the mixture starts becoming cloudy, which is commonly referred to as the cloud point. The lower the MMAP value, the greater the aromaticity and lower the aliphaticity of the resin.

"DACP," as defined herein, is a value which determines the polarity of a resin due to the highly polar nature of the solvent system. In order to determine the DACP value of resin, the resin must first be dissolved in a heated 1:1 mixture of xylene and 4-hydroxy-4-methyl-2-pentanone. The solution is then cooled with mixing. The temperature at which the solution begins becoming opaque is the cloud point, which is the DACP value.

Since specific adhesion is related to the polarity of a resin, the DACP value can be used as a specific adhesion indicator. Lower DACP values indicate greater specific adhesion.

"OMSCP," as defined herein, is a value which is related to the molecular weight and molecular weight distribution of a resin. OMSCP can determine the compatibility characteristics of a resin/polymer system. The higher the OMS cloud point, the greater the molecular weight and the molecular weight distribution of a resin. In particular, high OMSCP values can indicate the presence of high molecular weight materials (of Z-average molecular weight).

The term "OMSCP" is derived from the method for determining OMSCP values. A resin is first dissolved in a high temperature mixture of odorless mineral spirits (OMS). The solution is then cooled with mixing. The temperature at which the mixture starts becoming cloudy is referred to as the cloud point (CP), or OMSCP value.

B. Materials

The composite visco-elastic materials of the present invention are plasticizer extended elastomers which include a plasticizer component and an elastomer component.

Preferably, the elastomer component of the composite of the present invention includes a block copolymer. The plasticizers of the preferred embodiments of the present invention are resins. In addition, the material may include additives such as, but not limited to antioxidants, colorants, flame retardants, blowing agents and microspheres.

The plasticizer:elastomer ratio, by weight, of the preferred materials of the present invention ranges from as low as about 2.5:1 to as high as about 99:1. Thus, the plasticizer component of the composite visco-elastic material of the invention is referred to herein as the principle molecule or molecules. Preferably, the plasticizer:elastomer ratio is in the range of about 4:1 to about 20:1. A preferred ratio, such as 18:1, provides the desired amounts of rigidity and viscoelasticity and an acceptable level of strength. Increasing the amount of elastomer results in a stiffer, stronger material. A second preferred ratio of eight parts plasticizer to one part elastomer provides a material with such properties. The preferred plasticizers or plasiticizer mixtures useful in the material of the present invention are liquid or semi-solid at room temperature (i.e., about 22° C. to about 27° C.). Accordingly, prior to compounding, at least about 80% of the total volume of the constituents of the material of the invention, not including microspheres or other fillers, are liquid or semi-solid at room temperature. Use of different plasticizers or plasticizer mixtures and/or different elastomers or elastomer mixtures also alters the properties of the materials of the invention. The preferred materials of the present invention are more durable, stronger, have an unexpectedly low melt viscosity and cost less to produce than most existing elastomers and visco-elastomers. The preferred materials of the present invention also have better cushioning properties than many prior art elastomers and visco-elastomers in specific applications.

1. Elastomers

Tri-block polymers of the general configuration A-B-A, wherein the A represents a crystalline polymer such as a monoalkenylarene polymer and the B is an elastomeric polymer, are known and have been used by many as an additive to other materials to decrease the rigidity of those materials.

Many practitioners in the art add other materials when extending A-B-A triblock copolymers. For example, the addition of polypropylene is believed by many in the art to significantly increase the strength and rigidity of plasticizer extended elastomers. Similarly, many in the art add A-B diblock copolymers to oil-extended triblock copolymers to reduce oil bleed.

The elastomer component of the preferred material of the invention includes a tri-block polymer of the general configuration A-B-A, wherein the A represents a crystalline polymer such as a monoalkenylarene polymer including but not limited to polystyrene and the B is an elastomeric polymer such as poly(ethylene/butylene), hydrogenated poly(isoprene), hydrogenated poly(butadiene) or hydrogenated poly(isoprene+butadiene), or others. The A components of the material link to each other to provide strength, while the B components provide elasticity or viscoelasticity. Polymers of greater molecular weight are achieved by combining many of the A components in the A portions of each A-B-A structure and combining many of the B components in the B portion of the A-B-A structure, along with the networking of the A-B-A molecules into large three-dimensional polymer networks.

A preferred elastomer for making the material of the invention is a very high to ultra high molecular weight elastomer having an extremely high Brookfield Viscosity (hereinafter referred to as "solution viscosity"). Solution viscosity is generally indicative of molecular weight. "Solution viscosity" is defined as the viscosity of a solid when dissolved in toluene at 25–30° C., measured in centipoise (cps). "Very high molecular weight" is defined in reference to elastomers having a solution viscosity, 20% solids in 80% toluene, from greater than about 20,000 cps to about 50,000 cps. An "ultra high molecular weight elastomer" is defined as an elastomer having a solution viscosity, 20% solids in 80% toluene, of greater than about 50,000 cps. Ultra high molecular weight elastomers have a solution viscosity, 10% solids in 90% toluene, of about 800 and greater. The solution viscosities, in 80% toluene, of the A-B-A elastomer components useful in the present invention are substantially greater than 30,000 cps. The solution viscosities, in 90% toluene, of the elastomers useful in the present invention are in the range of about 2,000 cps to about 7,000 cps. Thus, the preferred elastomer component of the present invention has a high to ultra high molecular weight. Surprisingly, in light of the existing art, plasticizer extension of elastomers having solution viscosities in the range of about 20,000 cps to about 50,000 cps and higher resulted in much stronger compounds.

Applicant also prefers to use elastomers which have a molecular weight of at least about 200,000 in the material of the present invention. More preferably, the material of the invention includes elastomers with a molecular weight of about 250,000 or greater.

Kuraray Co. Ltd. of Tokyo, Japan has stated that the solution viscosity of SEPTON 4055, 10% solids in 90% toluene at 25° C., is about 5,800 cps. Kuraray also said that the solution viscosity of SEPTON 4055, 5% solids in 95% toluene at 25° C., is about 90 cps. Although Kuraray has not provided a solution viscosity, 20% solids in 80% toluene at 25° C., an extrapolation of the two data points given shows that such a solution viscosity would be about 400,000 cps.

Applicant confirmed Kuraray's data by having an independent laboratory, SGS U.S. Testing Company Inc. of Fairfield, N.J., test the solution viscosity of SEPTON 4055. When SGS attempted to dissolve 20% solids in 80% toluene at 25° C., the resulting material did not resemble a solution, and the solution viscosity according to that test was not measurable. Therefore, SGS determined the solution viscosity of SEPTON 4055 using 10% solids in 90% toluene at 25° C., which resulted in a 3,040 cps solution.

The elastomeric B portion of the preferred A-B-A polymers has an exceptional affinity for most plasticizing agents, including but not limited to several types of resins and oils. When the network of A-B-A molecules is denatured, plasticizers which have an affinity for the B block can readily associate with the B blocks. Upon renaturation of the network of A-B-A molecules, such a plasticizer remains highly associated with the B portions.

The elastomer used in the invention is preferably an ultra high molecular weight polystyrene-hydrogenated poly(isoprene+butadiene)-polystyrene, such as those sold under the brand names SEPTON 4045, SEPTON 4055 and SEPTON 4077 by Kuraray, an ultra high molecular weight polystyrene-hydrogenated polyisoprene-polystyrene such as the elastomers made by Kuraray and sold as SEPTON 2005 and SEPTON 2006, or an ultra high molecular weight polystyrene-hydrogenated polybutadiene-polystyrene, such as that sold as SEPTON 8006 by Kuraray. High to very high molecular weight polystyrene-hydrogenated poly(isoprene+butadiene)-polystyrene elastomers, such as that sold under the trade name SEPTON 4033 by Kuraray, are also useful in some embodiments of the present invention. Such high to very high molecular weight polystyrene-hydrogenated poly(isoprene+butadiene)-polystyrene elastomers are easier to process (e.g., have lower melt viscosities) than the preferred ultra high molecular weight elastomers useful in the invention.

Applicant's most preferred elastomer for use in the present invention is SEPTON 4055 or another material that has similar chemical and physical characteristics. Applicant has also found that the use of SEPTON 4033, SEPTON 4045, SEPTON 4077, and/or other elastomers with similar chemical and physical characteristics provide a material superior to similar materials which contain other elastomers. SEPTON 4033, SEPTON 4045 and SEPTON 4077 have one carbon side chains, which are believed to be partially responsible for the superior physical characteristics of the material of the invention compared to the material when other elastomers are used. The one carbon side chains of SEPTON 4055, SEPTON 4033, SEPTON 4045 and SEPTON 4077 are spaced at least about four midblock backbone carbons from one another, and occur, on average, on about one backbone carbon out of every eight to twenty backbone carbons. SEPTON 2005 and SEPTON 2006, which are also manufactured by Kuraray, are also believed to have one carbon side chains.

Mixtures of elastomers are also useful as the elastomer component of some of the formulations of the present invention. In elastomer mixtures, each elastomer contributes different properties to the material. For example, high strength elastomers are desired to improve the tensile strength and durability of a material. However, some high strength elastomers are very difficult to process with some plasticizers. Thus, in such a case, elastomers which improve the processability of the materials are desirable.

In particular, the process of extending SEPTON 4055 with REGALREZ® 1018 is improved by using a small amount of more flowable elastomer such as SEPTON 8006, SEPTON 2005, SEPTON 2006, or SEPTON 4033, to name only a few, without significantly changing the physical characteristics of the material.

In a second example of the usefulness of elastomer mixtures in the materials of the invention, many elastomers are not good compatibilizers. Thus, the use of small amount of elastomers which improve the uniformity with which a material mixes are desired. KRATON® G 1701, manufactured by Shell Chemical Company of Houston, Tex., is one such elastomer that is useful in the present invention.

Many other elastomers, including but not limited to triblock copolymers and diblock copolymers are also useful in the present invention. For example KRATON® FG1901X and KRATON® FG1921X, both manufactured by Shell Chemical, which have functionalized polystyrene end blocks, are each useful as an elastomer in the material of the invention. Maleic anhydride has been grafted onto the polystyrene end blocks of each of KRATON® FG1901X and KRATON® FG1921X. Maleic anhydride grafted styrene monomers are monoalkenylarenes.

Applicant believes that elastomers having a significantly higher molecular weight than the ultra-high molecular weight elastomers useful in the present invention increase the softness of a plasticizer extended material, but decrease its strength. Thus, high to ultra high molecular weight elastomers, as defined above, are desired for use in the material of the present invention due to their strength when combined with a plasticizer.

2. Additives a. Detackifiers

The cushioning material of the present invention may include a detackifier. Tack is not a desirable feature in many potential uses for the materials of the invention. For example, a ball made from a preferred material of the invention should not be tacky or it will accumulate dirt on its exterior. However, due to the use of resin plasticizers in the materials, the presence of tack is frequent. For example, a bandage made from a material of the invention may be tacky on one side to facilitate adhesion to human skin.

Soaps, detergents and other surfactants have detackifying abilities and are useful in the present invention. "Surfactants," as defined herein, refers to soluble surface active agents which contain groups that have opposite polarity and solubilizing tendencies. Surfactants form a monolayer at interfaces between hydrophobic and hydrophilic phases; when not located at a phase interface, surfactants form micelles. Surfactants have detergency, foaming, wetting, emulsifying and dispersing properties. Sharp, D. W. A., DICTIONARY OF CHEMISTRY, 381–82 (Penguin, 1990). For example, coco diethanolamide, a common ingredient in shampoos, is useful in the present invention as a detackifying agent. Coco diethanolamide resists evaporation, is stable, relatively non-toxic, non-flammable and does not support microbial growth. Many different soap or detergent compositions could be used as well.

Other known detackifiers include glycerin, epoxidized soybean oil, dimethicone, tributyl phosphate, block copolymer polyether, diethylene glycol mono oleate, and silicone to name only a few. Glycerine is available from a wide variety of sources. Witco Corp. of Greenwich, Conn. sells epoxidized soybean oil as DRAPEX 6.8. Dimethicone is available from a variety of vendors, including GE Specialty Chemicals of Parkersburg, W. Va. under the trade name GE SF 96-350. C.P. Hall Co. of Chicago, Ill. markets block copolymer polyether as PLURONIC L-61. C.P. Hall Co. also manufactures and markets diethylene glycol mono oleate under the name Diglycol Oleate-Hallco CPH-I-SE. Other emulsifiers and dispersants are also useful in the material of the present invention as detackifiers.

In particular, grapeseed oil such as Kenemeide E Ultra has been found to be a useful detackifier as it serves as a slip agent on the exterior of the elastomeric material.

Nevertheless, tacky materials are desirable in some uses of the materials of the present invention. However, contact with such tacky materials may be undesirable. Thus, in some applications where tacky materials are preferred, a barrier is needed to cover the tack and isolate it from unwanted contact. Examples of tack barriers which are useful for covering the materials of the present invention include stretchable fabrics such as that manufactured and sold by DuPont Corporation of Wilmington, Del. under the trade name LYCRA, stretchable fabrics coated with a thin layer of water and/or oil resistant material including but not limited to polyurethane, latex, neoprene and poly(vinylchloride), plastic films, non-tacky elastomeric layers and adhesion of particulate matter (e.g., lint, short threads, or talc) to the outer surface of the tacky material. Other materials may also be used as a barrier or detackifier.

When placed in a tight-weave, stretchable fabric, the materials of the invention do not escape, even when subjected to a great deal of pressure, such as being repeatedly driven over by an automobile. Further, the most preferred embodiments exhibit no migration of plasticizers, even when placed against materials which readily exhibit a high degree of capillary action, such as paper.

b. Antioxidants

A preferred compound of the present invention also includes additives such as an antioxidant. Antioxidants such as those sold under the trade names IRGANOX® 1010 and IRGAFOS® 168 by Ciba-Geigy Corp. of Tarrytown, N.Y. are useful by themselves or in combination with other antioxidants in the preferred materials of the present invention.

Antioxidants protect the preferred materials of the present invention against thermal degradation during processing which requires or generates heat. In addition, antioxidants provide long term protection from free radicals. A preferred antioxidant inhibits thermo-oxidative degradation of the compound or material to which it is added, providing long term resistance to polymer degradation. Preferably, an antioxidant added to the preferred materials of the present invention is useful in food packaging applications, subject to the provisions of 21 C.F.R. § 178.2010 and other laws.

Heat, light (in the form of high energy radiation), mechanical stress, catalyst residues, and reaction of a material with impurities all cause oxidation of the material. In the process of oxidation, highly reactive molecules known as free radicals are formed and react in the presence of oxygen to form peroxy free radicals, which further react with organic material (hydro-carbon molecules) to form hydroperoxides.

The two major classes of antioxidants are the primary antioxidants and the secondary antioxidants. Peroxy free radicals are more likely to react with primary antioxidants than with most other hydro-carbons. In the absence of a primary antioxidant, a peroxy free radical would break a hydro-carbon chain. Thus, primary antioxidants deactivate a peroxy free radical before it has a chance to attack and oxidize an organic material.

Most primary antioxidants are known as sterically hindered phenols. One example of sterically hindered phenol is the $C_{73}H_{108}O_{12}$ marketed by Ciba-Geigy as IRGANOX® 1010, which has the chemical name 3,5-bis(1,1-dimethylethyl)-4-hydroxybenzenepropanoic acid,2,2-bis [[3-[3,5-bis(dimethylethyl)-4-hydroxyphenyl]-1-oxopropoxy]methyl]1,3-propanediyl ester. The FDA refers to IRGANOX® 1010 as tetrakis[methylene(3,5-di-tert-butyl-4-hydroxyhydrocinnimate)]methane. Other hindered phenols are also useful as primary antioxidants in the present invention.

Similarly, secondary antioxidants react more rapidly with hydroperoxides than most other hydro-carbon molecules. Secondary antioxidants have been referred to as hydroperoxide decomposers. Thus, secondary antioxidants protect organic materials from oxidative degradation by hydroperoxides.

Commonly used secondary antioxidants include the chemical classes of phosphites/phosphonites and thioesters, many of which are useful in the materials of the present invention. The hydroperoxide decomposer used by Applicant is a $C_{42}H_{63}O_3P$ phosphite known as Tris(2,4-di-tert-butylphenyl)phosphite and marketed by Ciba-Geigy as IRGAFOS® 168.

It is known in the art that primary and secondary antioxidants form synergistic combinations to ward off attacks from both peroxy free radicals and hydroperoxides.

Other antioxidants, including but not limited to multifunctional antioxidants, are also useful in the present invention. Multifunctional antioxidants have the reactivity of both a primary and a secondary antioxidant. IRGANOX 1520 D, manufactured by Ciba-Geigy Corp. of Tarrytown, N.Y. is one example of a multifunctional antioxidant.

Preferably, the materials of the present invention include up to about three weight percent antioxidant, based on the weight of the elastomer component, when only one type of antioxidant is used. When a combination of antioxidants is used, each may comprise up to about three weight percent, based on the weight of the elastomer component. In the presently most preferred embodiment of the present invention, the materials include 2.5 weight percent primary antioxidant and 2.5 weight percent secondary antioxidant, both percentages based on the weight of the elastomer component of the material.

c. Flame retardants

Flame retardants may also be added to the materials of the present invention. Flame retardants useful in the invention include but are not limited to diatomaceous earth flame retardants sold as GREAT LAKES DE 83R and GREAT LAKES DE 79 by Great Lakes Filter, Division of Acme Mills Co. of Detroit, Mich. Most flame retardants that are useful in elastomeric materials are also useful in the materials of the present invention. In particular, applicant prefers the use of food grade flame retardants which do not significantly diminish the physical properties of the materials of the invention. Applicant has succeeded in using a flame retardant to make a material of the invention that is self-extinguishing.

d. Colorants

Colorants may also be used in the materials of the present invention. Any colorant which is compatible with elastomeric materials may be used in the materials of this invention. In particular, Applicant prefers to use aluminum lake colorants such as those manufactured by Warner Jenkinson Corp. of St. Louis, Mo.; pigments manufactured by Day Glo Color Corp. of Cleveland, Ohio; Lamp Black, such as that sold by Spectrum Chemical Manufacturing Corp. of Gardena, Calif.; and Titanium Dioxide (white). By using these colorants, Applicant has made materials that are beautiful shades of orange, blue, red, green, violet, pink, white, black, yellow, brown, flesh tone and others.

e. Bleed Reducing Additives

Preferably the material of the invention includes hydrocarbon chains with readily polarizable groups thereon, including without limitation halogenated hydrocarbons, nitrites, and others. Applicant believes that the polarizability of such groups on the hydrocarbon molecule of the bleed-reducing additive have a tendency to form weak van der Waals bonding with the long hydrocarbon chains of the rubber portion of the elastomer and with the plasticizer molecules. Due to the great length of typical rubber polymers, several of the bleed-reducers will be attracted thereto, while fewer will be attracted to each plasticizer molecule. The bleed-reducing addtivies are believed to hold the plasticizer molecules and the block copolymer molecues thereto, facilitating attraction between the elastomeric block and the plasticizer molecule. In other words, the preferred bleed-reducing additives are believed to attract a plasticizer molecule at one polarizable site, while attracting an elastomeric block at another polarizable site, thus maintaining the association of the plasticizer molecules with the elastomeric blocks, which inhibits exudation of the plasticizer molecules from the block copolymer-plasticizer compound. Thus, each of the plasticizer molecules is preferably attracted to an elastomeric block by a bleed-reducing additive.

The preferred bleed reducing additives have a plurality of polarizable groups thereon which facilitate bonding an additive molecule to a plurality of elastomeric blocks of the block copolymer molecules and/or plasticizer molecules. It is believed that an additive molecule with more polarizable sites thereon will bond to more plasticizer molecules. Preferably, the additive molecules remain in a liquid or solid state during processing of the material.

The most preferred bleed-reducing additives according to the present invention are halogenated hydrocarbon additives such as those sold under the trade names DYNAMAR™ PPA-791, DYNAMAR™ PPA-790, DYNAMAR™ FX-9613, and FLUORORAD® FC10 Fluorochemical Alcohol available from 3M Company of Minneapolis, Minn. Other additives are also useful to reduce plasticizer exudation from the material of the invention. Such additives include, without limitation, other halogenated hydrocarbons sold under the trade name FLUORORAD®, including without limitation FC-129, FC-135, FC-430, FC-722, FC-724, FC-740, FX-8, FC-13, Fc-14 and FX-189; halogenated hydrocarbons such as those sold under the trade name XONYL®, including without limitaion FSN 100, FSO 100, PFBE, 8857A, TM, DA-L, TBC and FTS, each of which are manufactured by Du Pont Corporation of Wilmington, Del.; halogenated hydrocarbons sold under the trade name EMCOL by Witco Corp. of Houston, Tex., including without limitation 4500 and DOSS; other halogenated hdrocarbons sold by 3M under the trade name DYNAMAR™; chlorinated polyethylene elastomer (CPE) distributed by Hartwick, Inc. of Akron, Ohio; chlorinated paraffin wax distributed by Hartwick, Inc., and others.

Processing materials with the invented bleed reducing additives is performed as described elsewhere in this document, with the temperature selected for processing the particular compound being that which will tend to maximize association between the bleed-reducing additive and the plasticizer. The maximum optimum processing temperature of the material is preferably just below the boiling point of the bleed-reducing additive. However, any temperature below the boiling point is useful for processing materials which include the additives of the present invention. Preferably, the processing temperature is less than the degradation temperature of the elastomer. For example, when FLUORORAD® FC 10 is compounded with about 8 parts weight plasticizer and about one weight part triblock copolymer in an injection molding machine or an extruder, 240 degrees C. is the preferred compounding temperature. The boiling point of FLUORORAD® FC 10 is about 244 degrees C. Bleed reducing additives such as DYNAMAR PPA 791 and DYNAMAR FX-9613 have higher boiling points, and therefore, can be processed at higher temperatures.

The following examples have been included to illustrate various formulations of the invented material. Percent oil bleed was measured y obtaining the combined weight of three disk-shaped samples of the material, each sample having a diameter of about 3 cm and a thickness of about 6.5 m. Two four inch (4") square pieces of 20# bond paper were then weighed individually. The three sample disks were placed on one of the pieces of paper (which has high capillary or wicking action), and the other piece of paper was placed on top of the samples. The material and paper were then placed in a plastic bag and pressure-sandwiched between two flat steel plates, each weighing about 2285 g. Next, the material samples, paper and steel plates were heated to about 110 degrees F. for about 4 hours. Alternatively, two pieces of 12.5 cm diameter qualitative filter paper having a medium filter speed and an ash content of about 0.15%, such as that sold under the trade name DOUBLE RINGS 102, and manufactured by Xinhua Paper Mill, may be used in place of the two four inch (4") square pieces of 20# bond paper.

| Component | Weight Percent (of Total) | Purpose |
|---|---|---|
| BLEED REDUCING ADDITIVE EXAMPLE A | | |
| SEPTON 4077 | 11.1 | elastomer |
| LP-150 mineral oil | 87.4 | plasticizer |
| FC-10 Fluorochemical Alcohol | 0.3 | bleed reducing additive |
| Saturn Yellow | 1.2 | pigment |
| BLEED REDUCING ADDITIVE EXAMPLE B | | |
| SEPTON 4055 | 12.3 | elastomer |
| LP-150 mineral oil | 86.1 | plasticizer |
| Zonyl FSN-100 | 0.4 | bleed reducing additive |
| Horizon Blue | 1.2 | pigment |
| BLEED REDUCING ADDITIVE EXAMPLE C | | |
| SEPTON 4055 | 12.3 | elastomer |
| LP-150 mineral oil | 86.1 | plasticizer |
| FC 10 | 0.4 | bleed reducing additive |
| Saturn Yellow | 1.2 | pigment |
| BLEED REDUCING ADDITIVE EXAMPLE D | | |
| SEPTON 4077 | 17.0 | elastomer |
| LP-150 mineral oil | 81.6 | plasticizer |
| FC 10 | 0.5 | bleed reducing additive |
| Neon Red | 0.9 | pigment |
| BLEED REDUCING ADDITIVE EXAMPLE E | | |
| SEPTON 4055 | 14.1 | elastomer |
| LP-150 mineral oil | 84.7 | plasticizer |
| FC 10 | 0.3 | bleed reducing additive |
| Magenta | 0.9 | pigment |
| BLEED REDUCING ADDITIVE EXAMPLE F | | |
| SEPTON 4055 | 14.1 | elastomer |
| LP-150 mineral oil | 84.7 | plasticizer |
| Zonyl FSN-100 | 0.3 | bleed reducing additive |
| Magenta | 0.9 | pigment |
| BLEED REDUCING ADDITIVE EXAMPLE G | | |
| SEPTON 4055 | 13.4 | elastomer |
| LP-150 mineral oil | 80.2 | plasticizer |
| KRATON ® G1701 | 0.3 | processing additive |
| IRGANOX 1010 | 0.2 | antioxidant |
| IRGAFOS 168 | 0.2 | antioxidant |
| DYNAMAR PPA 791 | 5.3 | bleed reducing additive |
| Magenta | 0.4 | pigment |
| BLEED REDUCING ADDITIVE EXAMPLE H | | |
| SEPTON 4055 | 14.1 | elastomer |
| LP-150 mineral oil | 84.7 | plasticizer |
| KRATON ® G1701 | 0.3 | processing additive |
| IRGANOX 1010 | 0.2 | antioxidant |
| IRGAFOS 168 | 0.2 | antioxidant |
| Rocket Red | 0.4 | pigment |

Examples A–G exhibited little or no oil bleed when tested with the above method using filter paper. The material of Example G lost only about 0.009 percent of its weight in oil bleed testing. In comparison, the material of Example H, which contained no bleed-reducing additive, lost about 0.24 percent of its weight due to oil exudation. In other words, the material without the invented bleed reducing additive bled out almost thirty times as much oil.

3. Microspheres

Microspheres may also be added to the materials of this invention. The material of the invention may contain up to about 90% microspheres, by volume. Different types of microspheres contribute various properties to the viscoelastic materials of the invention. For example, hollow acrylic microspheres, such as those marketed under the brand name MICROPEARL generally in the 20 to 200 micron size range by Matsumoto Yushi-Seiyaku Co., Ltd. of Osaka, Japan and available from PQ Corporation of Pennsylvania, impart elasticity to the material and lower its specific gravity. In another embodiment of the invention, the microspheres may be unexpanded DU(091-80) or expanded DE (091-80) acrylic microspheres from Expancel Inc. of Duluth, Ga. Unexpanded acrylic microspheres expand during processing of the material of the invention. Applicant believes that the elasticity of acrylic microspheres is responsible for this phenomenon of increased elasticity. When acrylic microspheres are used, the materials the present invention recover from deformation at an increased rate over the same material without acrylic microspheres. The reformation rate increases as more acrylic microspheres are added to the material. Consequently, Applicant believes that the use of more rigid microspheres, including but not limited to glass or carbon microspheres, would not significantly increase the rebound rate of the materials of the present invention, but may, if used in excess, reduce softness.

Hollow microspheres also decrease the specific gravity of the materials of the invention by creating gas pockets therein. In many cushioning applications, very low specific gravities are preferred. The specific gravity of the materials of the present invention may range from about 0.06 to about 1.30, depending upon the amount and specific gravity of fillers and additives, including microspheres and foaming agents. In many uses of the material of the invention, a specific gravity of less than about 0.50 is preferred. A specific gravity of less than about 0.30 is preferred for some uses of the material of the invention.

A preferred microsphere-containing embodiment of the material according to the present invention contains at least about 30% microspheres, by volume. Another preferred material of the invention includes at least about 50% microspheres, by volume.

4. Plasticizers a. Resins

Preferably, the plasticizer component of the material of the present invention is a commercially available resin or mixture of resins. Resins useful in the material of the present invention are preferably hydrocarbon-derived and rosin-derived resins having a ring and ball softening point of up to about 150° C., more preferably from about 0° C. to about 25° C. Thus, the most preferred resins for use in the material of the invention are liquid or semi-solid at about 25° C.

Applicant prefers the predominant use of resins or resin mixtures which are highly viscous flowable liquids at room temperature (about 23° C.). Plasticizers which are fluid at room temperature impart softness to the materials of the present invention. Although room temperature flowable resins are preferred, resins which are not flowable liquids at room temperature are also useful in the materials of this invention.

The resins most preferred for use in the present invention have a ring and ball softening point of about 18° C.; melt viscosities of about 10 poises (ps) at about 61° C., about 100 ps at about 42° C. and about 1,000 ps at about 32° C.; an onset glass transition temperature ($T_g$) of about –20° C.; a MMAP value of 68° C.; a DACP value of 15° C.; an OMSCP value of less than –40° C.; a number average molecular weight ($M_n$) of about 385; a weight average molecular weight ($M_w$) of about 421; and a Z-average molecular weight ($M_z$) of about 463. One such resin is marketed as REGALREZ® 1018 by Hercules Incorporated of Wilmington, Del.

Room temperature flowable resins that are derived from poly-β-pinene and have softenening points similar to that of REGALREZ® 1018 are also useful in the present invention. One such resin, sold as PICCOLYTE® S25 by Hercules Incorporated of Wilmington, Del., has a softening point of about 25° C.; melt viscosities of about 10 ps at about 80° C., about 100 ps at about 56° C. and about 1,000 ps at about 41° C.; a MMAP value of about 88° C.; a DACP value of about 45° C.; an OMSCP value of less than about –50° C.; a $M_z$ of about 4,800; a $M_w$ of about 1,950; and a $M_n$ of about 650.

Another room temperature flowable resin which is useful as a plasticizer in the present invention is marketed as ADTAC® LV by Hercules Incorporated of Wilmington, Del. That resin has a ring and ball softening point of about 5° C.; melt viscosities of about 10 ps at about 62° C., about 100 ps at about 36° C. and about 1,000 ps at about 20° C.; a MMAP value of about 93° C.; a DACP value of about 44° C.; an OMSCP value of less than about –40° C.; a $M_z$ of about 2,600; a $M_w$ of about 1,380; and a $M_n$ of about 800.

Resins such as the liquid aliphatic C-5 petroleum hydrocarbon resin sold as WINGTACK® 10 by the Goodyear Tire & Rubber Company of Akron, Ohio are also useful in the present invention. WINGTACK® 10 has a ring and ball softening point of about 10° C.; a Brookfield Viscosity of about 30,000 cps at about 25° C.; melt viscosities of about 10 ps at about 53° C. and about 100 ps at about 34° C.; an onset $T_g$ of about –37.7° C.; a $M_n$ of about 660; a $M_w$ of about 800; a 1:1 polyethylene-to-resin ratio cloud point of about 89° C.; a 1:1 microcrystalline wax-to-resin ratio cloud point of about 77° C.; and a 1:1 paraffin wax-to-resin ratio cloud point of about 64° C.

Resins that are not readily flowable at room temperature (i.e., have an extremely high viscosity), as well as resins that are solid at room temperature, are also useful in the materials of the present invention. One such solid resin is an aliphatic C-5 petroleum hydrocarbon resin having a ring an ball softening point of about 98° C.; melt viscosities of about 100 ps at about 156° C. and about 1000 ps at about 109° C.; an onset $T_g$ of about 46.1° C.; a $M_n$ of about 1,130; a $M_w$ of about 1,800; a 1:1 polyethylene-to-resin ratio cloud point of about 90° C.; a 1:1 microcrystalline wax-to-resin ratio cloud point of about 77° C.; and a 1:1 paraffin wax-to-resin ratio cloud point of about 64° C. Such a resin is available as WINGTACK® 95 and is manufactured by Goodyear Chemical Co. of Akron, Ohio.

Polyisobutylene polymers are an example of room temperature not readily flowable resins useful in the materials of the present invention. One such resin, sold as VISTANEX® LM-MS by Exxon Chemical Company of Houston, Tex., has a Tg of –60° C., a Brookfield Viscosity of about 25,000 to about 35,000 at about 350° F., a Flory molecular weight in the range of about 42,600 to about 46,100, and a Staudinger molecular weight in the range of about 10,400 to about 10,900. The Flory and Staudinger methods for determining molecular weight are based on the intrinsic viscosity of a material dissolved in diisobutylene at 20° C.

Glycerol esters of polymerized rosin are also useful as plasticizers in the present invention. One such ester, manufactured and sold by Hercules Incorporated of Wilmington, Del. as HERCULES® Ester Gum 10D Synthetic Resin, has a softening point of about 116° C.

Many other resins are also suitable for use in the present invention. In general, resins are preferred which are compatible with the B block of the elastomer used in the material, and non-compatible with the A blocks.

b. Plasticizer Mixtures

The addition of other plasticizers to the materials of the present invention is useful for tailoring the rate at which a material recovers from deformation. Preferably, when a one inch long piece of the material of the invention is stretched to a length of two inches, the material rebounds to substantially its original shape and size in more than about one second. More preferably, within the range of about one second to about ten minutes following the release of a strain force which stretches a one inch long piece of the material of this invention to two inches in length, the material rebounds to within five percent of its original shape and size.

Similarly, the addition of other types of plasticizers, such as oils, to the materials of the present invention alters the rate at which a material recovers from deformation. For example, use of mineral oils increases the rate of recovery. When plasticizing resins are used in the materials of this invention, the higher the softening point and $T_g$ of the resin, the slower the material's rate of recovery from deformation. Preferably, the plasticizing component of the material of the invention contains at least about 25% resin, by weight. More preferably, the plasticizing component of the material of the invention contains more resin plasticizers than oil plasticizers, by weight of the total plasticizer component.

For example, a plasticizer mixture which includes about 90 weight percent of a resin having physical characteristics similar to those of REGALREZ® 1018 (such as a softening point of about 20° C.; an onset glass transition temperature ($T_g$) of about −20° C.; a MMAP value of about 70° C.; a DACP value of about 15° C.; an OMSCP value of less than about −40° C.; and a weight average molecular weight ($M_w$) of about 400), about five weight percent of a resin having physical characteristics similar to those of REGALREZ® 1139 (such as such as a softening point of about 140° C.; an onset glass transition temperature ($T_g$) of about 80° C.; a MMAP value of about 108° C.; a DACP value of about 81° C.; an OMSCP value of less than about −10° C.; and a weight average molecular weight ($M_w$) of about 3,100), and about five weight percent of a resin having physical properties similar to those of REGALITE® R101 (such as a softening point of about 100° C.; an onset glass transition temperature ($T_g$) of about 45° C.; a MMAP value of about 78° C.; a DACP value of about 46° C.; an OMSCP value of less than about −38° C.; and a weight average molecular weight ($M_w$) of about 900), all weight percentages being based upon the total weight of the plasticizer mixture, could be used in a visco-elastic material according to the invention. When compared to a material plasticized with the same amount of a resin such as REGALREZ® 1018, the material which includes the plasticizer mixture has slower rebound and slightly increased tack and stiffness.

When mixing plasticizers, Applicant prefers the primary use of plasticizer mixtures which are liquid at room temperature. For example, ESTER GUM 10-D is not fluid at room temperature, but is desired in some applications since it contributes a great deal toward decreasing the rebound rate of the materials of the invention. However, because ESTER GUM 10-D does not flow at room temperature its use as the sole plasticizer of A-B-A elastomers does not result in a soft cushioning material. When ESTER GUM 10-D is mixed with sufficient amounts of plasticizers which readily flow at room temperature, such as REGALREZ® 1018, materials that are plasticized with the mixture form materials with a slow rebound rate and the desired amount of softness.

Applicant believes that, when a mixture of resins is used to plasticize a particular material, that material's actual rate of recovery from deformation is determined in part by each of the resins. In other words, the rate of recovery of such a material is believed to be between the deformation recovery rate of two materials having the same proportions of elastomer and plasticizer and the same additives in the same amounts as the mixed-resin plasticized material, one of the materials plasticized solely with the resin of the mixture that has the lowest $T_g$, the second material plasticized solely with the resin of the mixture that has the highest $T_g$.

Similarly, it has been Applicant's experience that when a plasticizer mixture includes resin and oil, the rate of deformation recovery is much faster than that of a material plasticized solely with a proportionate amount of resin or mixture of resins, but slower than the recovery rate of a material plasticized only with a proportionate amount of oil.

C. Compounding Methods

As used herein, the term "liquification" refers to the placement of the elastomer component and the resin component of the preferred materials of this invention in a liquid state, such as a molten state or a dissolved state.

1. Melt Blending

A preferred method for manufacturing the preferred materials of the present invention includes mixing the plasticizer, block copolymer elastomer and any additives and/or microspheres, heating the mixture to melting while agitating the mixture, and cooling the compound. This process is referred to herein as "melt blending".

Excessive heat is known to cause the degradation of the elastomeric B portion of A-B-A and A-B block copolymers. Similarly, maintaining block copolymers at increased temperatures over prolonged periods of time often results in the degradation of the elastomeric B portion of A-B-A and A-B block copolymers. As the B molecules of an A-B-A triblock copolymer break, the triblock is separated into two diblock copolymers having the general configuration A-B. While it is believed by some in the art that the presence of A-B diblock copolymers in oil-containing plasticizer-extended A-B-A triblock copolymers reduces plasticizer bleed-out, high amounts of A-B copolymers significantly reduce the strength of the materials of the present invention. Thus, Applicant believes that it is important to minimize the compounding temperatures and the amount of time to which the materials are exposed to heat.

The plasticizers, any additives and/or microspheres, and the A-B-A copolymer are premixed. Preferably, hydrophobic additives are dissolved into the plasticizer prior to adding the plasticizer to the elastomer component. Hydrophilic additives and particulate additives are preferably emulsified or mixed into the plasticizer of a preferred material of the present invention prior to adding the elastomer component. The mixture is then quickly heated to melting. Preferably, the temperature of the mixture does not exceed the volatilization temperature of any component. For most of the materials of the invention, Applicant prefers temperatures in the range of about 260° F. to about 290° F. A melting time of about ten minutes or less is preferred. A melting time of about five minutes or less is more preferred. Even more preferred are melting times of about ninety seconds or less. Stirring or agitation is preferred to create a homogeneous mixture. The mixture is then cast, extruded, injection molded, etc.

Next, the mixture is cooled. When injection molding equipment and cast molds are used, the mixture may be cooled by running coolant through the mold, by the thermal mass of the mold itself, by room temperature, by a combination of the above methods, or other methods. Extruded mixtures are cooled by air or by passing the extruded mixture through coolant. Cooling times of about five minutes or less are preferred. A cooling time of less than one minute is most preferred.

Use of high shear facilitates short heating times. "High shear", for purposes of this disclosure, is defined in terms of the length over diameter (L/D) ratio of a properly designed injection molding single screw or extruder single screw. L/D ratios of about 20:1 and higher create high shear. Twin screws, Banbury mixers and the like also create high shear. High shearing with heat mixes compounds at lower temperatures and faster rates than the use of heat alone or heat with relatively low-shear mixing. Thus, high shear forces expedite compounding of the mixture over a relatively short period of time by more readily forcing the molecules into close association with the B component of the A-B-A copolymer. Use of high shear also facilitates the decrease of equipment temperatures. Melt blending techniques which employ little or no shear require an external heat source. Thus, in order to avoid heat loss, the periphery of many types of melt blending equipment must be heated to a temperature higher than the melt temperature in order to transfer heat and melt a component mixture. In comparison, high shearing equipment can generate high material temperatures directly from the shear forces, substantially reducing or eliminating the need for external heating.

The inventor prefers the use of equipment that produces high shear, such as twin screw compounding extrusion machinery, to melt blend the material of the present invention. Twin screw extruders such as the ZE25 TIEBAR AIR COOLED TWIN SCREW EXTRUDER, with a 35:1 L/D ratio, manufactured by Berstorff Corporation of Charlotte, N.C., and twin screw extruders with L/D ratios of about 24:1, sold under the trade name MICROTRUDER™ RCP0750 by Randcastle Extrusion Systems, Inc. of Cedar Grove, N.J., are useful for compounding the material of the present invention. Twin screw compounding extrusion machinery is desired for compounding the preferred materials of the present invention since it generates a very high level of shear and because compounding and molding, casting, extrusion, or foaming are performed in one continuous process. Alternatively, the elastomeric gel of the invention may be compounded first, then later formed into a finished product by injection molding, extrusion, or some other method.

It was mentioned above that microspheres may be added to the gel of the invention to reduce its specific gravity, to increase its stiffness or durometer, and to increase its rebound rate. Glass microspheres usually will not survive high shear. However, Applicant has unexpectedly discovered that acrylic microspheres remain intact when subjected to the heat and shear of injection molding machines and extruders if the time at high temperature is kept to about five minutes or less. Thus, acrylic microspheres are preferred over glass microspheres.

Other equipment, such as batch mixers are also useful for melt blending the preferred materials of the present invention.

2. Solvent Blending

A second preferred method for making the preferred elastomeric compounds of the present invention comprises dissolving the elastomeric component in a solvent, adding plasticizer and any additives and/or microspheres, and removing the solvent from the mixture.

Aromatic hydrocarbon solvents such as toluene may be used for mixing the preferred compounds of the present invention. Sufficient solvent is added to the elastomer component to dissolve the network of block copolymer molecules. Preferably, the amount of solvent is limited to an amount sufficient for dissolving the network of block copolymer molecules. The elastomer then dissolves in the solvent. Mixing is preferred since it speeds up the solvation process. Next, plasticizer and additives are mixed into the solvated elastomer. Hydrophobic additives are preferably dissolved in the plasticizer prior to adding the plasticizer to the elastomer component and the solvent. Hydrophilic additives and particulate additives are preferably emulsified or mixed into the plasticizer prior to adding the elastomer component and solvent. The mixture is then cast into a desired shape and the solvent is evaporated from the mixture.

Other methods of compounding the preferred materials, including but not limited to other processes for extending elastomeric materials, are also within the scope of the present invention.

3. Foaming

The materials of the present invention may be foamed. "Foaming", as defined herein, refers to processes which form gas bubbles or gas pockets in the material of the invention. A foamed material, according to the invention, includes gas bubbles dispersed throughout the material. Both open cell and closed cell foaming are useful in the material of the invention. Foaming decreases the specific gravity of the materials of the invention. In many cushioning applications, very low specific gravities are preferred. For example, bicyclists place a premium on equipment, such as seats, that is light. Foaming may be used to create a light weight gel suitable for use in a premium bicycle seat. The specific gravity of the materials of the present invention may range, after foaming, from about 0.06 to about 1.30. Depending upon the particular application for a material according to the invention, gas pockets may make up as much as about 90% of the volume of the material.

When blowing agents such as sodium bicarbonate and chemical blowing agents are used in the material of the invention, the material temperature is preferably adjusted just prior to addition of the blowing agent so that the material temperature is just above the blowing temperature of the blowing agent. Following addition of the blowing agent to the material, the material is allowed to cool so that it will retain the gas bubbles or gas pocket formed by the release of gas from the blowing agent. Preferably, the material is quickly cooled to a temperature below its glass transition temperature (Tg). The material will retain more gas bubbles and the gas bubbles will be more consistently dispersed throughout the material the quicker the material temperature cools to a temperature below the Tg.

When a material according to the invention is injection molded, in accordance with one preferred compounding method of the material of the invention, foaming is preferred just after the material has been injected into a mold. Thus, as the material passes through the injection molding machine nozzle, its temperature is preferably just higher than the blowing temperature of the blowing agent. Preferably, the material is then cooled to a temperature below its Tg.

Various methods for foaming the materials of the present invention include, but are not limited to whipping or injecting air bubbles into the material while it is in a molten state, adding compressed gas or air to the material while it is in the molten state and under pressure, adding water to the material while it is in the molten state, use of sodium bicarbonate, and use of chemical blowing agents such as those marketed under the brand name Safoam® by Reedy International Corporation of Keyport, N.J.

Addition of polyisobutylene resin improves the ability of the materials of this invention to foam and retain cells during the foaming process. One such resin, known as VISTANEX® LM-MS, is manufactured by Exxon Chemical Company of Houston, Tex. Similarly, surfactants, dispersants and emulsifiers such as Laureth-23, available from Lonza of Fair Lawn, N.J. under the trade name ETHOSPERSE LA-23, and others may be used to facilitate foaming of the material of the invention. Applicant has also discovered that Ester Gum 10D increases the body of the material of the invention, which is also believed to facilitate foaming of the material. In formulations which include oil, certain foaming oils such as Hydraulic and Transmission Oil made by Spectrum Corp. of Selmer, Tenn. and others may also be used in the material to facilitate foaming of the materials.

4. Premixing of Microspheres

In formulations within the scope of this invention which include microspheres, premixing the microspheres with the plasticizer may result in a more uniform mixture (i.e., a better final product) and makes the microsphere-containing materials of the present invention easier to process. For example, the materials may be premixed by hand.

D. Examples

Each of U.S. Provisional patent application Ser. No. 60/047,560 which was filed on May 22, 1997, and U.S. patent application Ser. Nos. 08/783,415; 08/780,839; 08/783,414; 08/783,413; 08/780,838; and 08/783,412 filed on Jan. 10, 1997 are hereby incorporated by reference in their entirety.

The following examples have been prepared by Applicant.

EXAMPLE 1

| Component | Generic Class | Weight Percent of Total |
| --- | --- | --- |
| Septon 4055 | A-B-A copolymer | 5.46 |
| Kraton G1701 | A-B copolymer | 0.55 |
| Irganox 1010 | antioxidant | 0.16 |
| Irgafos 168 | antioxidant | 0.16 |
| LP-150 | plasticizing oil | 32.77 |
| Regalrez 1018 | plasticizing resin | 54.62 |
| Kristalex 5140 | strengthening resin | 0.55 |
| Regalite R101 | plasticizing resin | 2.73 |
| Regalrez 1139 | plasticizing resin | 2.73 |
| PQ 6545 microspheres | added to increase rebound rate and decrease specific gravity | 0.16 |
| Bright orange aluminum lake | colorant | 0.11 |

SEPTON® 4055 imparts form and strength to the visco-elastic material. KRATON® G-1701 is used to facilitate a more homogeneous blend of the elastomer (A-B-A copolymer) and plasticizer components. REGALREZ® 1018, a room temperature plasticizer, is the primary plasticizer used in the material. REGALITE® R101 and REGALREZ® 1139 are also plasticizers and modify the tack of the visco-elastic material. KRISTALEX® 5140 is believed to impart strength to the styrene domains or centers of the A-B-A copolymer. It is also believed to have some plasticizing abilities when used in combination with A-B-A copolymers. IRGANOX® 1010 and IRGAFOS® 168 are antioxidants. The material of Example 1 was made as an early experiment. Consequently, LP-150, a plasticizing oil, was used in combination with the resin plasticizers.

The material of Example 1 was prepared by premixing the components and melt blending them in an injection molding machine according to one preferred compounding method of the present invention. The material was very tacky and readily deformable, had very quick rebound and was very soft. Applicant believes that the very quick rebound rate is caused by the presence of plasticizing oil and microspheres. The specific gravity of the material was 0.40.

EXAMPLE 2

| Component | Generic Class | Weight Percent of Total |
| --- | --- | --- |
| Septon 8006 | A-B-A copolymer | 2.42 |
| Septon 4055 | A-B-A copolymer | 2.42 |
| Kraton G1701 | A-B copolymer | 0.48 |
| Irganox 1010 | antioxidant | 0.15 |
| Irgafos 168 | antioxidant | 0.15 |
| Regalrez 1018 | plasticizing resin | 87.18 |
| Kristalex 5140 | strengthening resin | 0.48 |
| Regalite R101 | plasticizing resin | 2.42 |
| Regalrez 1139 | plasticizing resin | 2.42 |
| PQ 6545 microspheres | added to increase rebound rate and decrease specific gravity | 1.39 |
| Bright orange aluminum lake | colorant | 0.24 |
| Dow Corning 200 silicone | rubber additive | 0.24 |

In the material of Example 2, SEPTON® 8006 was used in combination with SEPTON® 4055 to provide some form, but a softer visco-elastic material. Silicone was added to detackify the material.

The material of Example 2 was prepared by premixing the components and melt blending them in an injection molding machine according to one preferred compounding method of the present invention. The material was slightly tacky and readily deformable, had slow rebound and moderate stiffness. The use of silicone seems to have decreased the tackiness of the material. The specific gravity of the material was 0.30.

EXAMPLE 3

| Component | Generic Class | Weight Percent of Total |
| --- | --- | --- |
| Septon 8006 | A-B-A copolymer | 2.45 |
| Septon 4055 | A-B-A copolymer | 2.45 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.38 |
| Kristalex 5140 | strengthening resin | 0.49 |
| Regalite R101 | plasticizing resin | 2.46 |
| Regalrez 1139 | plasticizing resin | 2.46 |
| PQ 6545 microspheres | added to increase rebound rate and decrease specific gravity | 0.28 |
| Bright orange aluminum lake | colorant | 0.25 |

The material of Example 3 was prepared by premixing the components and melt blending them in an injection molding machine according to one preferred compounding method of the present invention. The material was very tacky and readily deformable, had a slow to moderate rebound rate and was extremely soft. The specific gravity of the material was 0.65.

EXAMPLE 4

| Component | Generic Class | Weight Percent of Total |
|---|---|---|
| Septon 8006 | A-B-A copolymer | 2.45 |
| Septon 4055 | A-B-A copolymer | 2.45 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.06 |
| Kristalex 5140 | strengthening resin | 0.49 |
| Regalite R101 | plasticizing resin | 2.45 |
| Regalrez 1139 | plasticizing resin | 2.45 |
| PQ 6545 microspheres | added to increase rebound rate and decrease specific gravity | 0.64 |
| Bright orange aluminum lake | colorant | 0.24 |

The material of Example 4 was prepared by premixing the components and melt blending them in an injection molding machine according to the preferred compounding method of the present invention. The material was very tacky and readily deformable, had moderate rebound and moderate softness. The specific gravity of the material was 0.44.

EXAMPLE 5

| Component | Generic Class | Weight Percent of Total |
|---|---|---|
| Septon 8006 | A-B-A copolymer | 2.43 |
| Septon 4055 | A-B-A copolymer | 2.43 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 87.51 |
| Kristalex 5140 | strengthening resin | 0.49 |
| Regalite R101 | plasticizing resin | 2.43 |
| Regalrez 1139 | plasticizing resin | 2.43 |
| PQ 6545 microspheres | added to increase rebound rate and decrease specific gravity | 1.26 |
| Bright orange aluminum lake | colorant | 0.24 |

The material of Example 5 was prepared by premixing the components and melt blending them in an injection molding machine according to the preferred compounding method of the present invention. The material was tacky and readily deformable, had very quick rebound and moderate softness. The specific gravity of the material was 0.28.

EXAMPLE 6

| Component | Generic Class | Weight Percent of Total |
|---|---|---|
| Septon 8006 | A-B-A copolymer | 2.44 |
| Septon 4055 | A-B-A copolymer | 2.44 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 87.78 |
| Kristalex 5140 | strengthening resin | 0.49 |
| Regalite R101 | plasticizing resin | 2.44 |
| Regalrez 1139 | plasticizing resin | 2.44 |
| PQ 6545 microspheres | added to increase rebound rate and decrease specific gravity | 0.95 |
| Colorant-bright orange aluminum lake | | 0.24 |

The material of Example 6 was prepared by premixing the components and melt blending them in an injection molding machine according to the preferred compounding method of the present invention. The material was very tacky and readily deformable, had slow rebound and little stiffness. The specific gravity of the material was 0.37.

EXAMPLE 7

| Component | Generic Class | Weight Percent of Total |
|---|---|---|
| Septon 4033 | A-B-A copolymer | 0.29 |
| Septon 8006 | A-B-A copolymer | 4.05 |
| Kraton G1701 | A-B copolymer | 0.09 |
| Irganox 1010 | antioxidant | 0.12 |
| Irgafos 168 | antioxidant | 0.12 |
| Regalrez 1018 | plasticizing resin | 86.73 |
| Kristalex 5140 | plasticizing resin | 0.87 |
| Regalite R101 | plasticizing resin | 2.02 |
| Regalrez 1139 | plasticizing resin | 2.02 |
| Vistanex LM-MS | plasticizing resin | 2.89 |
| PQ 6545 microspheres | added to increase rebound rate and decrease specific gravity | 0.37 |
| Safoam FP-powder | blowing agent | 0.43 |

In the material of Example 7, SEPTON® 4033 was used as a lower molecular weight polymer to help trap foam bubbles. A greater weight percentage of SEPTON® 8006 was used to provide a material which was softer than the materials of the preceding examples. VISTANEX® LM-MS was also added to determine whether its presence improved the material's ability to retain foam bubbles.

In preparing the material of Example 7, the solid resins were first crushed and premixed. The VISTANEX® LM-MS was heated for thirty minutes in an oven at about 150 to 200° C. The REGALREZ® and VISTANEX® were then mixed together with heat until the VISTANEX® appeared to be completely solvated.

The components of the material of Example 7 were then melt blended in an injection molding machine according to one preferred compounding method of the present invention. The material was very tacky and readily deformable, had very slow rebound and was very soft. The use of VISTANEX® LM-MS appears to have decreased the rebound rate of the material. The specific gravity of the material was 0.61.

EXAMPLE 8

| Component | Generic Class | Weight Percent of Total |
|---|---|---|
| Septon 4033 | A-B-A copolymer | 0.29 |
| Septon 8006 | A-B-A copolymer | 4.05 |
| Kraton G1701 | A-B copolymer | 0.09 |
| Irganox 1010 | antioxidant | 0.12 |
| Irgafos 168 | antioxidant | 0.12 |
| Vistanex LM-MS | plasticizing resin | 2.90 |
| Regalrez 1018 | plasticizing resin | 86.85 |
| Kristalex 5140 | strengthening resin | 0.87 |
| Regalite R101 | plasticizing resin | 2.03 |
| Regalrez 1139 | plasticizing resin | 2.03 |
| PQ 6545 microspheres | added to increase rebound rate and decrease specific gravity | 0.67 |

In preparing the material of Example 8, the crystallized (not readily flowable at room temperature) resins were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The components of the material of Example 8 were then melt blended in an injection molding machine according to the preferred compounding method of the present invention. The material was very tacky and readily deformable, had extremely slow, incomplete rebound and was very soft. The specific gravity of the material was 0.47.

EXAMPLE 9

| Component | Generic Class | Weight Percent of Total |
|---|---|---|
| Septon 4077 | A-B-A copolymer | 4.67 |
| Irganox 1010 | antioxidant | 0.30 |
| Irgafos 168 | antioxidant | 0.30 |
| Regalrez 1018 | plasticizing resin | 83.25 |
| Vistanex LM-MS | plasticizing resin | 1.81 |
| Kristalex 5140 | plasticizing resin | 0.96 |
| Regalite R101 | plasticizing resin | 1.93 |
| Regalrez 1139 | plasticizing resin | 1.93 |
| PQ 6545 microspheres | added to increase rebound rate and decrease specific gravity | 0.60 |
| Glycerin | detackifying agent | 4.25 |

SEPTON® 4077 was included in the material of Example 9 to provide form and strength to the material, yet provide a softer material than that using SEPTON® 4055. The crystallized (not readily flowable at room temperature) resins of Example 9 were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The remaining components were then quickly mixed and melt blended in an injection molding machine according to one preferred compounding method of the present invention. The material was very tacky (but less than a comparable material without the glycerin), readily deformable, had extremely slow, incomplete rebound and moderate softness. Use of SEPTON® 4077 appears to have resulted in a material which is softer than those which include SEPTON® 4055 as the only plasticizer, but stiffer than materials of the previous examples which have a combination of copolymers. The specific gravity of the material was 0.40.

EXAMPLE 10

| Component | Generic Class | Weight Percent of Total |
|---|---|---|
| Septon 4077 | A-B-A copolymer | 4.67 |
| Irganox 1010 | antioxidant | 0.30 |
| Irgafos 168 | antioxidant | 0.30 |
| Regalrez 1018 | plasticizing resin | 83.25 |
| Vistanex LM-MS | plasticizing resin | 1.81 |
| Kristalex 5140 | strengthening resin | 0.96 |
| Regalite R101 | plasticizing resin | 1.93 |
| Regalrez 1139 | plasticizing resin | 1.93 |
| PQ 6545 microspheres | added to increase rebound rate and decrease specific gravity | 0.60 |
| Glycerin | detackifying agent | 4.25 |

Glycerine was added to detackify the material of Example 10. In preparing the material of Example 10, the crystallized (not readily flowable at room temperature) resins were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The remaining components were then mixed thoroughly and melt blended in an injection molding machine according to one preferred compounding method of the present invention. The material was moderately tacky and readily deformable, had quick rebound and was soft. Glycerine appears to have reduced the tackiness of the material. The specific gravity of the material was 0.42.

EXAMPLE 11

| Component | Generic Class | Weight Percent of Total |
|---|---|---|
| Septon 4055 | A-B-A copolymer | 2.47 |
| Septon 8006 | A-B-A copolymer | 2.47 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.85 |
| Kristalex 5140 | strengthening resin | 0.49 |
| Regalite R101 | plasticizing resin | 2.47 |
| Regalrez 1139 | plasticizing resin | 2.47 |

The material of Example 11 was prepared by premixing the components and melt blending them in an injection molding machine according to the preferred compounding method of the present invention. The material was extremely tacky and readily deformable, had slow rebound and was very soft. The specific gravity of the material was 0.37.

EXAMPLE 12

| Component | Generic Class | Weight Percent of Total |
| --- | --- | --- |
| Septon 4055 | A-B-A copolymer | 2.35 |
| Septon 8006 | A-B-A copolymer | 2.35 |
| Kraton G 1701 | A-B copolymer | 0.47 |
| Irganox 1010 | antioxidant | 0.14 |
| Irgafos 168 | antioxidant | 0.14 |
| Regalrez 1018 | plasticizing resin | 84.36 |
| Kristalex 5140 | strengthening resin | 0.47 |
| Regalite R101 | plasticizing resin | 2.34 |
| Regalrez 1139 | plasticizing resin | 2.34 |
| PQ 6545 microspheres | added to increase rebound rate and decrease specific gravity | 0.36 |
| Glycerin | detackifying agent | 4.69 |

The material of Example 12 was prepared by premixing the components and melt blending them in an injection molding machine according to one preferred compounding method of the present invention. The material was very tacky and readily deformable, had slow rebound and little stiffness.

EXAMPLE 13

| Component | Generic Class | Weight Percent of Total |
| --- | --- | --- |
| Septon 4055 | A-B-A copolymer | 2.39 |
| Septon 8006 | A-B-A copolymer | 2.39 |
| Kraton G1701 | A-B copolymer | 0.48 |
| Irganox 1010 | antioxidant | 0.14 |
| Irgafos 168 | antioxidant | 0.14 |
| Regalrez 1018 | plasticizing resin | 80.21+ (see premix below) |
| Kristalex 5140 | strengthening resin | 0.48 |
| Regalite R101 | plasticizing resin | 2.39 |
| Regalrez 1139 | plasticizing resin | 2.39 |
| Premixed microspheres | | 9.00 |
| PQ 6545 microspheres | added to increase rebound rate and decrease specific gravity | 11.76% of premix (1.06) |
| Regalrez 1018 | | 88.24% of premix (7.94) |

The material of Example 13 was prepared by premixing the components and melt blending them in an injection molding machine according to one preferred compounding method of the present invention. The material was extremely tacky and readily deformable, had slow rebound and little stiffness. The specific gravity of the Example 13 material was about 0.63.

Pre-blending the microspheres with REGALREZ® 1018 was, in part, advantageous because it reduced the amount of microspheres that were dispersed into the air during agitation, making the microspheres easier to handle.

EXAMPLE 14

A visco-elastic material was made which included four parts REGALREZ® 1018 (plasticizing resin), four parts HERCULES® Ester Gum 10D (plasticizing resin) and one part SEPTON 4055 (A-B-A copolymer). The components were mixed, placed in an oven and heated to about 300° F. After all of the components became molten, they were mixed, poured onto a flat surface and cooled. The material had little tack, deformed under pressure, was very stiff but readily deformable with light sustained pressure, and had an extremely slow rate of rebound.

EXAMPLE 15

| Component | Generic Class | Weight Percent of Total |
| --- | --- | --- |
| Septon 4055 | A-B-A copolymer | 11.75 |
| Ester Gum 10D | visco-elasticity enhancer | 35.25 |
| Regalrez 1018 | plasticizing resin | 29.38 |
| Kristalex 5140 | strengthening resin | 1.18 |
| Foral 85 | strengthening resin | 3.53 |
| LP-150 oil | plasticizing oil | 14.10 |
| Ethosperse LA-23 | foaming facilitator | 3.53 |
| Irganox 1010 | antioxidant | 0.35 |
| Irgafos 168 | antioxidant | 0.35 |
| Aluminum Lake Colorant (Rocket red) | | 0.59 |

The material of Example 15 was prepared by premixing the components and melt blending them in an injection molding machine according to one preferred compounding method of the present invention. The material was moderately tacky and deformable under slight, prolonged compressive force, had extremely slow rebound and was very stiff.

FORAL 85, manufactured by Hercules, is a glycerol ester of hydrogenated resin that is used primarily as a tackifier. In the present invention, FORAL 85 acts as a strengthening resin, and is believed to associate with and bind together the styrene domains. ETHOSPERSE LA-23, known generically in the art as Laureth-23, is used in the art as an emulsifier. Laureth-23 facilitates foaming in the material of the present invention. The other components of Example 15 have been explained above.

EXAMPLE 16

| Component | Generic Class | Amount (grams) |
| --- | --- | --- |
| Septon 4055 | A-B-A copolymer | 80.00 |
| Septon 4077 | A-B-A copolymer | 80.00 |
| Kraton G-1701 | A-B copolymer | 16.00 |
| Regalrez 1018 | plasticizing resin | 2688.00+ (see microsphere premix below) |
| Irganox 1010 | antioxidant | 4.80 |
| Irgafos 168 | antioxidant | 4.80 |
| Premixed microspheres | | 402.30 |
| PQ 6545 microspheres | added to increase rebound rate and decrease specific gravity | 11.76% of premix (47.31 g) |

The material of Example 16 was prepared by preheating the REGALREZ® 1018, mixing all of the components except the microspheres together, and melt blending the components in a heated vessel at 295° F. under about one to about four pounds pressure for about two hours, according to a compounding method of the present invention. The mixture was then transferred to another vessel, which was heated to about 300° F., and the premixed microspheres and REGALREZ® 1018 were mixed in by hand.

The material was very tacky and readily deformable, had moderately slow rebound and was very soft. The specific gravity of the material of Example 16 was about 0.51.

Of the preceding sixteen examples, Applicant preferred the material of Example 16 because of its extreme softness and slow to moderate rebound rate. Applicant also liked the material of Example 15 because of its stiffness, but easy deformability under sustained pressure, and its extremely slow rate of reformation.

EXAMPLE 17

A visco-elastic material which includes from about one to about 30 weight percent of a triblock copolymer and about 70 to about 99 weight percent of a plasticizer, said weight percentages being based upon the total weight of the visco-elastic material. The visco-elastic material may also include up to about 2.5 weight percent of a primary antioxidant and up to about 2.5 weight percent of a secondary antioxidant, said weight percentages based upon the weight of the triblock copolymer.

Additives such as colorants, flame retardants, detackifiers and other additives may be included. Various formulations of the material of the present invention may be tailored to achieve softness, strength, tackiness and specific gravity as desired.

EXAMPLE 18

| Component | Generic Class | Weight Percent |
|---|---|---|
| Septon 4055 | A-B-A copolymer | 24.84 |
| Witco LP-200 white mineral oil | plasticizer | 74.51 |
| Irganox 1010 | antioxidant | 0.25 |
| Irgafos 168 | antioxidant | 0.25 |
| DuPont Zonyl BA-N Flurochemical Alcohol | bleed reducing agent | 0.16% |
| PQ 6545 microspheres | added to increase rebound rate and decrease specific gravity | 11.76% of premix (47.31 g) |
| Regalrez 1018 | | 88.24% of premix (354.99 g) |

EXAMPLE 19

| Component | Weight Percent (of Total) | Purpose |
|---|---|---|
| SEPTON® 4055 | 24.8 | tri-block copolymer elastomer |
| LP-150 | 74.3 | plasticizing mineral oil |
| IRGANOX® E 17 | 0.9 | antioxidant |
| DYNAMAR® PPA 791 | 0.1 | bleed reducing additive |

SEPTON® 4055 is a polystyrene-hydrogenated poly (isoprene+butadiene)-polystyrene tri-block copolymer manufactured by Kuraray Co., Ltd. of Tokyo, Japan. LP 150 is a paraffinic mineral oil manufactured by Witco Corp. of Petrolia, Pa. IRGANOX® E 17 is a liquid vitamin E antioxidant, which is manufactured by Ciba-Geigy of Tarrytown, N.Y. DYNAMAR® PPA 791 is a fluorochemical plasticizer bleed reducing additive manufactured by 3M Company of St. Paul, Minn.

EXAMPLE 20

| Component | Weight Percent (of Total) | Purpose |
|---|---|---|
| SEPTON® 4055 | 24.6 | tri-block copolymer elastomer |
| REGALREZ® 1018 | 18.4 | plasticizing resin |
| LP 150 | 55.3 | plasticizing mineral oil |
| IRGANOX® 1010 | 0.4 | antioxidant |
| IRGAFOS® 168 | 0.4 | antioxidant |
| DYNAMAR® PPA 791 | 0.1 | bleed reducing additive |
| Horizon Blue | 0.9 | pigment |

REGALREZ® 1018 is a hydrocarbon resin manufactured by Hercules Incorporated of Wilmington, Del. IRGANOX® 1010 and IRGAFOS® 168 are both sold by Ciba-Geigy.

| Component | Weight Percent (of Total) | Purpose |
|---|---|---|

EXAMPLE 21

| | | |
|---|---|---|
| SEPTON® 4055 | 11.0 | tri-block copolymer elastomer |
| KRATON® G 1701 | 0.1 | di-block copolymer elastomer |
| LP 150 | 87.7 | plasticizing mineral oil |
| IRGANOX® 1010 | 0.3 | antioxidant |
| IRGAFOS® 168 | 0.3 | antioxidant |
| DYNAMAR® PPA 791 | 0.1 | bleed reducing additive |
| Rocket Red | 0.5 | pigment |

EXAMPLE 22

| | | |
|---|---|---|
| SEPTON® 4055 | 16.3 | tri-block copolymer elastomer |
| KRATON® G 1701 | 0.2 | di-block copolymer elastomer |
| LP 150 | 81.7 | plasticizing mineral oil |
| IRGANOX® 1010 | 0.4 | antioxidant |
| IRGAFOS® 168 | 0.4 | antioxidant |
| DYNAMAR® PPA 791 | 0.1 | bleed reducing additive |
| Saturn Yellow | 0.8 | pigment |

EXAMPLE 23

| | | |
|---|---|---|
| SEPTON® 4055 | 24.1 | tri-block copolymer elastomer |
| REGALREZ® 1018 | 18.1 | plasticizing resin |
| LP 150 | 54.4 | plasticizing mineral oil |
| IRGANOX® 1010 | 0.4 | antioxidant |
| IRGAFOS® 168 | 0.4 | antioxidant |
| DYNAMAR® PPA 791 | 0.1 | bleed reducing additive |
| PM 6545 | 1.7 | acrylic microspheres |
| Horizon Blue | 0.8 | pigment |

EXAMPLE 24

| | | |
|---|---|---|
| SEPTON® 4055 | 24.567 | tri-block copolymer elastomer |
| LP-200 | 73.701 | plasticizing mineral oil |
| IRGANOX® 1076 | 0.246 | antioxidant |
| IRGAFOS® 168 | 0.246 | antioxidant |
| KENEMIDE E ULTRA | 0.246 | grapeseed oil-detackifier |
| Horizon Blue | 0.995 | pigment |

Kenemide E Ultra is grapeseed oil that is used as a slip agent or detackifier to produce a product with a non-tacky exterior.

E. Uses

1. General

The tailorability of the materials of the present invention makes them useful in many different product applications. Thin layers of the materials may be used as padding or backing for carpets and rugs. In construction, the materials are useful for temporary roof repair, as an undercoating to prevent roof leakage and provide insulation, in paint masking applications, and as a thin shatter resistant layer between window panes.

The materials are also useful in a wide variety of cushioning applications. When a deforming force is applied to the visco-elastic composite material of the invention, the material deforms in a visco-elastic manner. When placed under a compression force, the visco-elastic material tends to exhibit a flowing or fluid-like movement away from the compression force. Deformation of the visco-elastic material of this invention causes it to conform to protrusions on the object being cushioned. This deformation occurs because of the flowing movement of the visco-elastic substance. The deformability, flowing and conformability of the cushioning materials of the invention act together to provide a supporting force against the object being cushioned which is roughly equalized across the irregular shape of the object. In other words, when used in cushioning applications, the visco-elastic material of the invention avoids placement of significantly high pressure on protrusions of the object being supported.

Some of the stiffer materials of the invention have a very slow rate of deformation. For example, under instantaneous pressure, the material of Example 15 seems rigid and substantially maintains its shape. However, when pressure is applied to that material for a prolonged period of time, such as several seconds, the material readily deforms.

After a deforming force has been removed from the preferred materials of the present invention, the visco-elastic materials rebound to substantially their original size and shape at a rate which is substantially slower than the rate at which a fully elastic material of the same softness would rebound. Quick rebound corresponds with a tendency to exert pressure against a cushioned object, the pressure being greatest on the parts of the cushioned objects which protrude the most, and therefore, deform the cushioning material the furthest. Thus, in many cushioning applications, a slow rate of deformation is preferable.

As an example of the use of the visco-elastic composites of the present invention as a cushion, in shoes, the materials of the invention would be useful as shoe insoles and inserts. They could also be used in furniture cushions, mattresses, floor mat pads, car seat cushions, bicycle seat cushions, shoulder strap cushions, stadium cushions, wheelchair cushions, prosthesis pads, crutch pads, motor mount cushions, pads for vibration dampening of machines, computer mouse, keyboard and wrist pads, and padding in protective gear, to name only a few cushioning uses for the materials.

For example, FIGS. 10 and 11 illustrate a bike seat 1102 made using a material according to the invention includes a hard plastic base 1114 attachable to the seat post of a bicycle, an open cell foam rubber layer 1112 overlaying the base, and a layer 1110 of viscoelastic material of the invention molded to the general shape of a bicycle saddle. A barrier 1116 such as coated or uncoated LYCRA®, manufactured by DuPont Corporation of Wilmington, Del., covers the three layers. If the material according to the invention is a tacky formulation, then a tack barrier layer is especially important unless adhesion properties are desired. The tack barrier layer could also be cloth threads, polyester, nylon, cotton, wool, velvet, velour, particulate material, talc, power, dust, sawdust, plastic particles or other materials embedded into the exterior surface of the viscoelastic material, or simply a layer of cloth. The materials of the invention provide a bicycle seat cushion that is soft and conforming.

The readily deformable visco-elastic materials of the present invention are also useful in medical applications, including but not limited to use as wraps, bandages, and hot/cold packs. They could also be used for various purposes in toys, such as making toys that are durable, yet pleasant to touch and stretch. Many other applications not detailed here can make use of the material of this invention.

Tacky materials are desirable in some uses of the materials of the present invention. Nevertheless, contact with such tacky materials may be undesirable. Thus, in some applications where tacky materials are preferred, a barrier or detackifying layer is needed to isolate the tack from unwanted contact with foreign objects. Examples of tack barriers which are useful for covering the materials of the present invention include stretchable fabrics such as that manufactured and sold by DuPont Corporation of Wilmington, Del. as LYCRA, stretchable fabrics coated with a thin layer of water and/or oil resistant material including but not limited to polyurethane, latex, neoprene and poly (vinylchloride), plastic films, non-tacky elastomeric layers and adhesion of particulate or fibrous matter (such as microspheres, talc, silica, cotton threads or the like) to the outer surface of the tacky material.

When placed in a tight-weave, stretchable fabric, the preferred materials of the invention do not escape, even when subjected to a great deal of pressure, such as being repeatedly driven over by an automobile.

The materials of the present invention may be cast, extruded, pressure-molded, or otherwise formed into a variety of presently existing shapes, such as the shape of known bicycle seats or shoe components. Alternatively, the invented materials may be custom shaped to maximize performance.

An advantage of the materials of the present invention over many prior art cushioning media, such as many foams, viscous fluids, gels and lubricated microspheres, is that the materials of the invention need not be contained in a bladder.

2. Fabric Coating

The invented materials and methods may also be utilized in the in the area of coated flexible porous materials, such as fabric and paper. More specifically, the invention relates to a coated flexible porous material coated with a high-strength, high-elongation, low-durometer, low-dimensional-set, affordable, non-wicking elastomer gel.

For purposes of simplifying the discussion below, focus is on coating of fabrics. However, the invention and the inventive concept applies to all coated flexible/pliable porous materials. As a non-limiting example, it applies to coated papers used for surgical drapes. As another example, it applies to coated flexible open-cell polyurethane foams, standard or reticulated.

The prior art contains numerous coated fabrics. The coating of fabrics is necessary in many product applications because fabrics (woven or non-woven) are inherently porous to gases (such as air) and liquid (such as water or urine). Many product applications require that a fabric be relatively impervious to gases and/or liquids. The reason can be to keep a gas or liquid in or to keep a gas or liquid out. Examples include an article of outdoor clothing, a hospital mattress cover, or a bladder for a fluid-filled cushion component. In some cases, the objective is to completely seal out the gas or liquid. In others, it may be to slow down the permeation of the gas or liquid. In others, it may be to allow virtually no permeation of the liquid but slow permeation of gases or vapors; for example, an article of clothing which is waterproof in the rain but which allows air and vapor through to cool the wearer and dissipate sweat.

The reason for using a fabric in most products, as opposed to a solid substance is to achieve a combination of suppleness and strength. The drawback to most prior art coatings or films which are laminated to fabrics is that they reduce the suppleness, or 'hand', of the fabric. Another drawback to many coatings is that they are relatively expensive.

Coatings on fabrics in the prior art are numerous. Polyurethane films with elasticity are laminated to elastic fabrics such as Lycra from Dupont. One such fabric is made by Penn Nyla of England. Rubber compounds are also laminated or solvent-coated onto fabrics. A common example is neoprene rubber, often foamed, laminated to a stretchable or pliable fabric and used for fisherman's waders, diver's wet suits, and orthopedic braces. Silicone gels are also used as coatings on fabrics. As an example, many of the air bags on automobiles comprise a silicone-coated supple fabric. In that case, the silicone coating acts to keep in the hot gases which inflate the bag. There are many other coatings used, typically of a highly pliable, usually elastic nature, such as synthetic elastomeric polymers or polymer compounds. Unfortunately, all of the above named coatings or laminated films substantially decrease the suppleness of the fabrics to which they are applied, and most are relatively expensive.

In U.S. Pat. Nos. 5,336,708 and 5,633,286 which are hereby incorporated by reference, John Y. Chen claims the use of a highly plasticized A-B-A tri-block copolymer (elastic gel) which is physically interlocked with another material, which could be fabric (or in his teachings, could be wood, metal, plastic, glass, etc.). His claims cover an A-B-A tri-block co-polymer in which the A portion is styrene and the B portion is either ethylene-butylene (SEBS) or ethylene-propylene (SEPS), or a mixture of the two, in which the A-B-A has a high solution viscosity. His preferred solution viscosity at 20% solids in toluene @ 25 degrees C. is 1,800, and while he says it may be higher, he teaches away from very high solution viscosities. Mr. Chen's elastic gel is supple enough to not substantially reduce the suppleness of a fabric to which it is coated, and is less expensive than other coatings mentioned (but still more expensive than the coating of my invention). It is also of limited strength in comparison with other coatings mentioned above, though it has such high elongation that the fabrics to which it is coated would reinforce it before strength became an issue. Unfortunately, Mr. Chen's elastic gel has a significant problem in that the plasticizer, typically mineral oil, is easily wicked out of the gel. For example, if placed on an ordinary piece of paper such as would be used in a photocopy machine, over the course of a few hours it would leave a significant oil stain. This unfortunate property limits the usefulness of his gel as a coating for fabrics.

There thus exists a need for a fabric coating which does not substantially reduce the suppleness or elasticity of the fabric to which it is coated, is strong enough to endure the rigors to which the fabric may be put, is inexpensive, and does not bleed plasticizers. The invention meets this need.

The invention includes coating fabrics etc. with a highly plasticized A-B-A tri-block co-polymer of the SEEPS or SEEEPS variety (styrene-[ethylene-ethylene-propylene]-styrene or styrene-[ethylene-ethylene-ethylene-propylene]-styrene). The EEEP mid-block is preferably of very high molecular weight, such that the solution viscosity is so high as to be essentially a solid when at 20% solids in toluene @ 25 degrees C. Preferably, the plasticizer is a white paraffinic mineral oil such as Witco LP-200. Preferably, an fluorochemical such as Dupont Zonyl BA-N is added to slow or completely prevent the wicking out of the plasticizer. My most preferred SEEEPS tri-block co-polymer is Septon 4055 by Kuraray of Japan. Interestingly, Mr. Chen mentions this very Septon 4055 polymer in his U.S. Pat. No. 5,633,286 as a potential A-B-A co-polymer to be used in his invention. However, he lists it in the same listing as dozens of other A-B-A tri-block co-polymers, and it is obvious to one skilled in the art that he is simply listing every A-B-A tri-block elastomeric co-polymer available for sale and has not tried Septon 4055 and does realize its advantages. Evidences of this are several: First, many of the tri-block copolymers that he lists right along Septon 4055 are of such a nature that they would not make an elastomeric gel at all, but rather a grease. Obviously, a grease would not be suitable for coating fabrics or for any of the other applications mentioned in his invention, yet he lists them. Second, he gives a lengthy discussion about the necessary solution viscosity of the A-B-A copolymer in order for it to be applicable to his invention. Many of the tri-block copolymers that he lists right along Septon 4055 would have solution viscosities far too low to be within his requirements, yet he lists them. Furthermore, Septon 4055 is a solid elastomeric gel when combined with toluene at 20% solids @ 25 degrees C., and not a liquid at all, so that solution viscosity is a meaningless term for Septon 4055, yet he lists it. Third, if he had tested Septon 4055 at all he would have been very surprised at how much less plasticizer wicking occurred, and how much stronger it was than his preferred A-B-A copolymers. Thus he would have made sure to include SEEEP and/or SEEP in his claims, but his claims cover only SEBS and SEPS or mixtures thereof. And thus he would have claimed it as his most preferred tri-block co-polymer, rather than listing it along with many, many other tri-block co-polymers which did not meet his needs and did not meet his own criteria. Simply listing all of the known commercial A-B-A tri-block copolymers in the fashion that he did, without trying them or even being knowledgeable enough about them to know if they would meet the needs and specified criteria of his invention, does not constitute a prior art teaching of value. I was very surprised to find that Septon 4055 gave the most excellent properties that it did, especially after reading Chen's several patents which teach away from an A-B-A tri-block copolymer which is a solid in toluene, and I learned of these amazing properties through experimentation.

The most preferred plasticizer to copolymer ratio for fabric coatings is in the range of 4-to-1 to 2-to-1. More or less plasticizer is allowable within the scope of the invention. More plasticizer is not preferred for most applications because the tackiness of the gel is higher as plasticizer content increases. Less plasticizer is not preferred for most applications because the lower the plasticizer content, the more effect on suppleness will be noticed.

While my preferred gel has substantially less plasticizer wicking than Chen's claimed gels, the potential still exists for wicking if conditions are right. Thus, the need exists for an additive which substantially reduces and preferably completes stops wicking of the plasticizer. The fabric coating of the invention thus preferably includes an additive such as is fully described above. As stated above, my most preferred additive is Dupont's fluorochemical alcohol Zonyl BA-N, added at 0.05% to 0.75%, typically 0.20% to 0.35%, of the total gel weight. Other fluorochemicals, particularly fluorochemical alcohols and surfactants, are also preferred anti-wicking additives in the coating of the invention.

The results of applying my preferred gel coating to a fabric are excellent. Because the durometer is so low (Shore A10 at the highest, but usually well below the Shore A scale altogether), the suppleness of the fabric is virtually unaffected. Since it can stretch to as much as twenty times its original length without permanent set, and since it is of such low durometer, the stretchiness of fabrics such as Dupont's Lycra is virtually unaffected. It is essentially water-proof. It has a low degree of air permeability, so that in very thin coatings it allows some breathing of air and vapors, and with somewhat thicker coatings is for all practical purposes gas impermeable. It is very lightweight, with a density of 0.86 to 0.88 grams per cubic centimeter (as a comparison, silicone gel is about 0.98, polyurethane film is about 1.25, and rubber density varies depending on fillers used but is generally more than that of my preferred gel. It is relatively inexpensive, costing about 80% as much as Mr. Chen's preferred gels, 50% as much as neoprene, and 30% as much as polyurethane film. It does not wick plasticizer at all at room temperature when placed next to photocopier paper.

My gel can be applied to fabrics in a variety of ways. One preferred method is to solvate the gel ingredients in toluene or another organic solvent, using enough toluene to produce the viscosity desired. The solvated gel is coated onto the fabric by coating means well known in the art, such as a roller and doctor blade, then the toluene is evaporated off, usually with heat, and usually recovered so as to prevent air pollution. Another preferred method is to heat and shear the gel ingredients at sufficient temperature (usually 350 to 400 degrees F. is sufficient) that a thoroughly molten and mixed fluid is obtained. The molten fluid is then coated onto the fabric with similar means as in the solvated case, and the molten gel is allowed to cool and solidify. Other means are also feasible, including but not limited to extruding the molten gel into a film, cooling it, then heat-laminating the film to the fabric. Other methods might include hot molten gel spray and solvated gel spray.

The invention is not to be limited by the foregoing preferences and examples. Any type of fabric or other pliable, porous material (including but not limited to paper and foam) coated with or laminated to the range of gels described above or coated with or laminated to any plasticized elastomer containing anti-wicking additives or bleed-reducing additives as described above also falls within the scope of the invention. Any method of applying the coating or laminated layer of the invention is acceptable.

3. Podalic Pads

More particularly, the podalic pads of the invention include elastomeric and/or visco-elastomeric materials. Preferably, the pads of the invention readily conform to the shape of a user's foot to equalize loads against cushioned portions of a user's foot, then return to substantially their original shape and size following release of the deforming load.

The podalic pads of the invention are preferably formed from a soft, resilient, highly elastomeric material such as the material disclosed in U.S. patent application Ser. Nos. 08/780,838, 08/783,412, 08/783,413, 08/783,415, 08/780,839, and 08/738,414 and U.S. Provisional patent application Ser. No. 60/047,790 each of which are hereby incorporated by reference in its entirety. The following examples illustrate some useful formulations of such an elastomeric material.

EXAMPLE I

| Component | Weight Percent (of Total) | Purpose |
|---|---|---|
| SEPTON ® 4055 | 24.8 | tri-block copolymer elastomer |
| LP 150 | 74.3 | plasticizing mineral oil |
| IRGANOX ® E 17 | 0.9 | antioxidant |
| DYNAMAR ® PPA 791 | 0.1 | bleed reducing additive |

SEPTON® 4055 is a polystyrene-hydrogenated poly(isoprene+butadiene)-polystyrene tri-block copolymer manufactured by Kuraray Co., Ltd. of Tokyo, Japan. LP 150 is a paraffinic mineral oil manufactured by Witco Corp. of Petrolia, Pa. IRGANOX® E 17 is a liquid vitamin E antioxidant, which is manufactured by Ciba-Geigy of Tarrytown, N.Y. DYNAMAR® PPA 791 is a fluorochemical plasticizer bleed reducing additive manufactured by 3M Company of St. Paul, Minn.

EXAMPLE II

| Component | Weight Percent (of Total) | Purpose |
|---|---|---|
| SEPTON ® 4055 | 24.6 | tri-block copolymer elastomer |
| REGALREZ ® 1018 | 18.4 | plasticizing resin |
| LP 150 | 55.3 | plasticizing mineral oil |
| IRGANOX ® 1010 | 0.4 | antioxidant |
| IRGAFOS ® 168 | 0.4 | antioxidant |
| DYNAMAR ® PPA 791 | 0.1 | bleed reducing additive |
| Horizon Blue | 0.9 | pigment |

REGALREZ® 1018 is a hydrocarbon resin manufactured by Hercules Incorporated of Wilmington, Del. IRGANOX® 1010 and IRGAFOS® 168 are both sold by Ciba-Geigy.

EXAMPLE III

| Component | Weight Percent (of Total) | Purpose |
|---|---|---|
| SEPTON ® 4055 | 11.0 | tri-block copolymer elastomer |
| KRATON ® G 1701 | 0.1 | di-block copolymer elastomer |
| LP 150 | 87.7 | plasticizing mineral oil |
| IRGANOX ® 1010 | 0.3 | antioxidant |
| IRGAFOS ® 168 | 0.3 | antioxidant |
| DYNAMAR ® PPA 791 | 0.1 | bleed reducing additive |
| Rocket Red | 0.5 | pigment |

EXAMPLE IV

| Component | Weight Percent (of Total) | Purpose |
|---|---|---|
| SEPTON ® 4055 | 16.3 | tri-block copolymer elastomer |
| KRATON ® G 1701 | 0.2 | di-block copolymer elastomer |
| LP 150 | 81.7 | plasticizing mineral oil |
| IRGANOX ® 1010 | 0.4 | antioxidant |
| IRGAFOS ® 168 | 0.4 | antioxidant |
| DYNAMAR ® PPA 791 | 0.1 | bleed reducing additive |
| Saturn Yellow | 0.8 | pigment |

EXAMPLE V

| Component | Weight Percent (of Total) | Purpose |
|---|---|---|
| SEPTON ® 4055 | 24.1 | tri-block copolymer elastomer |
| REGALREZ ® 1018 | 18.1 | plasticizing resin |
| LP 150 | 54.4 | plasticizing mineral oil |
| IRGANOX ® 1010 | 0.4 | antioxidant |
| IRGAFOS ® 168 | 0.4 | antioxidant |
| DYNAMAR ® PPA 791 | 0.1 | bleed reducing additive |
| PM 6545 | 1.7 | acrylic microspheres |
| Horizon Blue | 0.8 | pigment |

EXAMPLE VI

| Component | Weight Percent (of Total) | Purpose |
|---|---|---|
| SEPTON ® 4055 | 24.567 | tri-block copolymer elastomer |
| LP-200 | 73.701 | plasticizing mineral oil |
| IRGANOX ® 1076 | 0.246 | antioxidant |
| IRGAFOS ® 168 | 0.246 | antioxidant |
| KENEMIDE E ULTRA | 0.246 | grapeseed oil-detackifier |
| Horizon Blue | 0.995 | pigment |

EXAMPLE VII

| Component | Weight Percent (of Total) | Purpose |
|---|---|---|
| SEPTON ® 4055 | 24.84 | tri-block copolymer elastomer |
| LP-200 | 74.51 | plasticizing mineral oil |
| IRGANOX ® 1010 | 0.25 | antioxidant |
| IRGAFOS ® 168 | 0.25 | antioxidant |
| DuPont Zonyl BA-N Fluorochemical Alcohol | 0.25 | anti-bleed agent |

-continued

| Component | Weight Percent (of Total) | Purpose |
|---|---|---|
| EXAMPLE VIII | | |
| SEPTON ® 4055 | 16.46 | tri-block copolymer elastomer |
| LP-200 | 82.30 | plasticizing mineral oil |
| IRGANOX ® 1010 | 0.25 | antioxidant |
| IRGAFOS ® 168 | 0.25 | antioxidant |
| DuPont Zonyl BA-N Fluorochemical Alcohol | 0.74 | anti-bleed agent |
| EXAMPLE IX | | |
| SEPTON ® 4055 | 19.80 | tri-block copolymer elastomer |
| LP-200 | 79.21 | plasticizing mineral oil |
| IRGANOX ® 1010 | 0.25 | antioxidant |
| IRGAFOS ® 168 | 0.25 | antioxidant |
| DuPont Zonyl BA-N Fluorochemical Alcohol | 0.50 | anti-bleed agent |

Kenemide E Ultra is grapeseed oil that is used as a slip agent or detackifier to produce a podalic pad with a non-tacky exterior. Other elastomeric materials, including without limitation plasticized elastomers which contain polarizable plasticizer bleed reducing additives, are also useful in the podalic pads of the present invention.

One preferred visco-elastomeric material, which has a specific gravity of about 0.64, includes about 2½ weight percent SEPTON® 4055; about 2½ weight percent SEPTON® 4033, sold by Kuraray; about 93.8 weight percent REGALREZ® 1018, sold by Hercules Incorporated of Wilmington, Del.; about 0.1 weight percent IRGANOX® 1010, about 0.1 weight percent IRGAFOS® 168 and about 0.9 weight percent of acrylic microspheres, such as those such as those marketed under the brand name MICROPEARL generally in the 20 to 200 micron size range by Matsumoto Yushi-Seiyaku Co., Ltd. of Osaka, Japan; all weight percentages being based upon the total weight of the mixture. Other formulations of the material which have similar properties but different specific gravities may also be made by varying only the amount of microspheres in the material. Other formulations of that visco-elastomeric material, as well as other visco-elastomeric materials with similar properties are also within the scope of the present invention.

Flexible materials, particulate matter or fibers may be adhered to the podalic pads of the present invention. Flexible, somewhat elastic materials that are useful for covering the podalic pads of the present invention include, without limitation, the material manufactured and sold by DuPont Corporation of Wilmington, Del. and sold under the trade name LYCRA; other stretchable fabrics; plastic films; non-tacky elastomeric layers (e.g., elastomers which are less tacky than the elastomeric or visco-elastic material used in the podalic pad), and others. Other types of covers or barriers may also be useful, including the adhesion of particulate matter or fibers (such as microspheres, lint, short threads, talc, ground cork or others), including but not limited to discontinuous fibers and others to the outer surface of the podalic pad material. Such a covering may serve as a tack barrier between the podalic pad and a user's foot.

Figure 12:
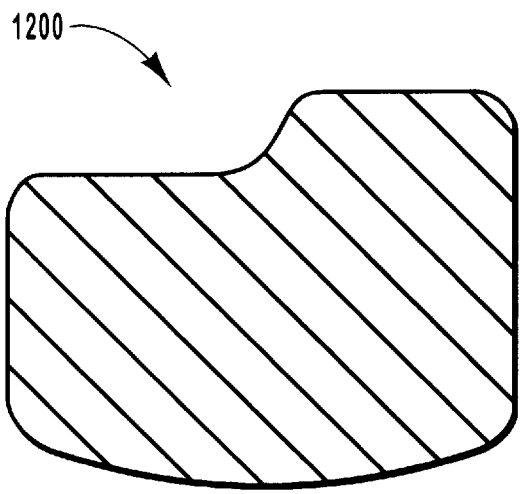
FIG. 12 depicts a top plan view of a forefoot pad.
Figure 13:
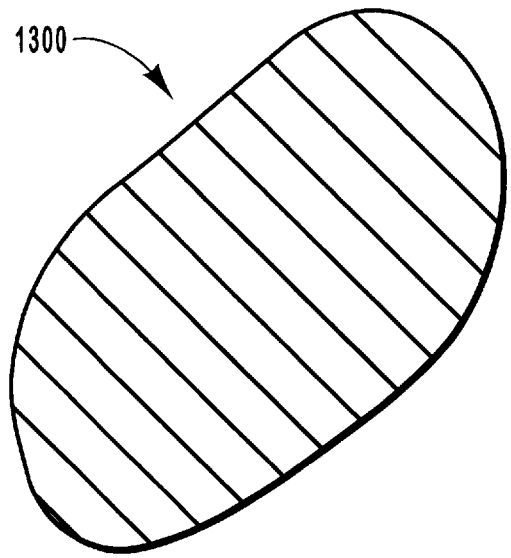
FIG. 13 depicts a top plan view of a forefoot pad.
Figure 14:
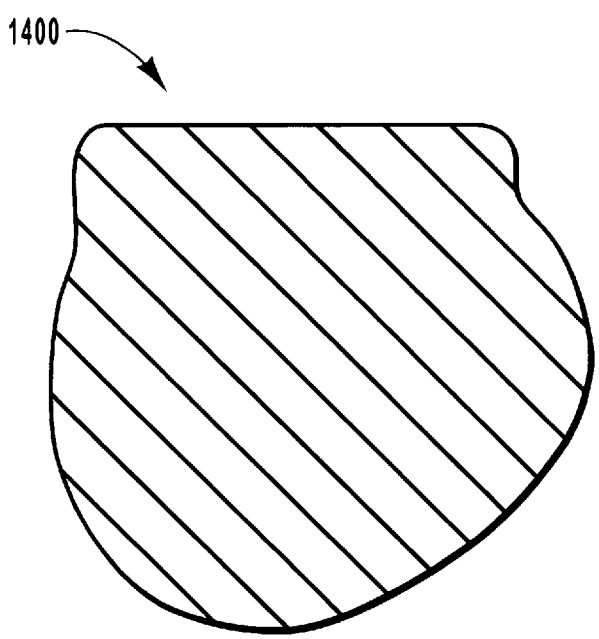
FIG. 14 depicts a top plan view of an ankle pad.
Figure 15:
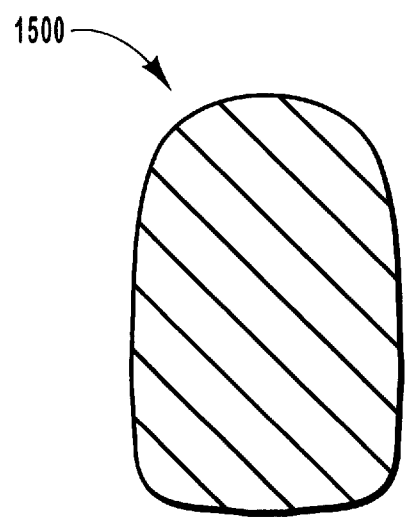
FIG. 15 depicts a top plan view of a heel strike pad.
Figure 16:
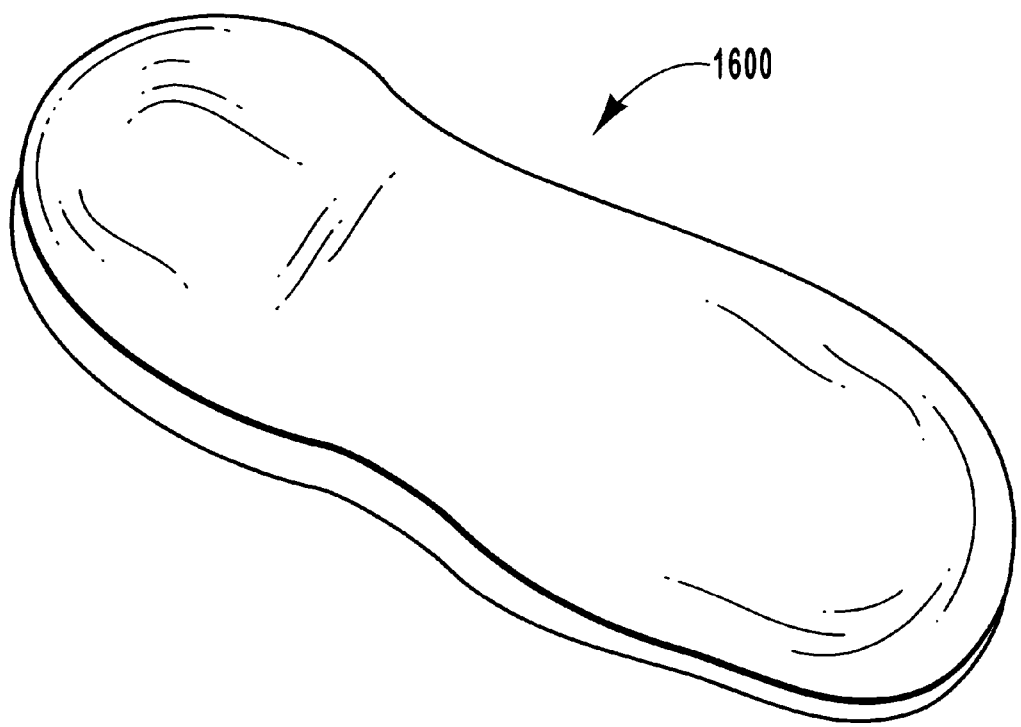
FIG. 16 depicts a perspective view of a sock insert.

FIGS. 12 through 17 illustrate various embodiments of the podalic pads of the invention. FIG. 12 is a top plan view of a first configuration of a forefoot pad 1200 according to the present invention. FIG. 13 is a top plan view of a second configuration of a forefoot pad 1300 according to the present invention. FIG. 14 is a top plan view of an ankle pad 1400 of the present invention. FIG. 15 is a top plan view of a heel strike pad 1500 according to the present invention. FIG. 16 is a perspective view of a preferred embodiment of a sock insert 1600 of the invention.

Each of the pads may be flat with a consistent thickness over the entire pad. Alternatively, each of the pads may have contoured upper and/or lower surfaces for enhanced conformation to the shape of a user's foot or for therapeutic benefit.

Figure 17:
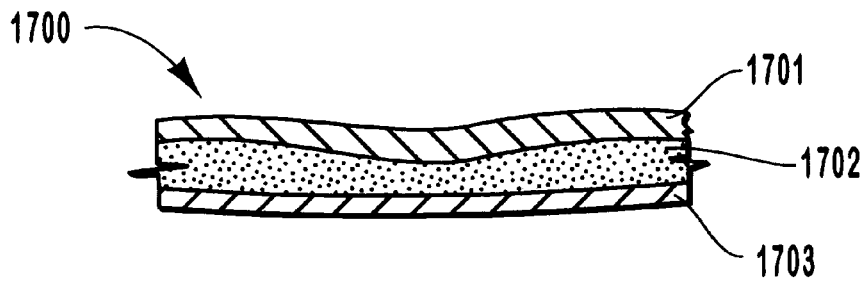
FIGS. 17 and 18 depict layered podalic pads.
Figure 18:
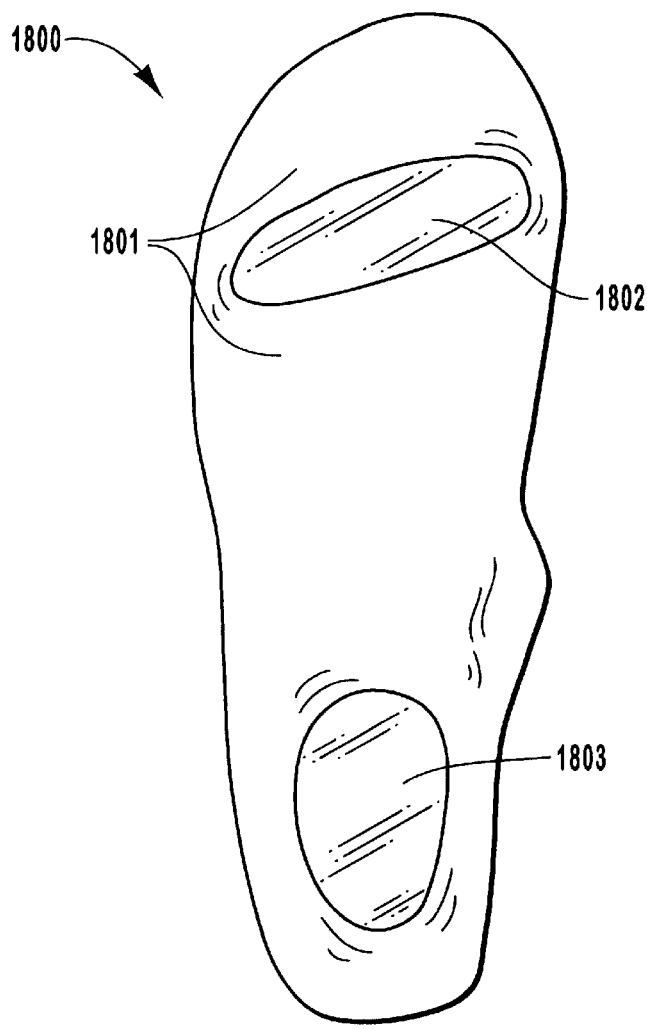

With reference to FIGS. 17 and 18, the podalic pads of the present invention may have a plurality of layers, shown in FIG. 17, and/or multiple sections, as seen in FIG. 18. FIG. 17 is a cross-sectional view through a multi-layered pad 600 according to the present invention, which shows layers 1701, 1702 and 1703. Preferably, adjacent layers 1701, 1702 and 1702, 1703 of podalic pad 1700 are made from different cushioning materials or different formulations of the same type of cushioning material (e.g., different formulations of the elastomeric material or visco-elastomeric podalic pad material disclosed herein). At least one of the layers of pad 1700 is made from an elastomeric or visco-elastomeric material disclosed in the patent applications which have been incorporated by reference above.

FIG. 18 is a top plan view of a pad 1800 having a primary cushioning body 1801 and secondary cushioning zones 1802 and 1803. Although two secondary cushioning zones are shown, pad 1800 may have only one secondary cushioning zone or more than two secondary cushioning zones. Preferably, the secondary cushioning zones are positioned on pad 1800 in locations which will receive protrusions or pressure points of a user's foot. At least one of the primary cushioning body 1601 or a secondary cushioning zone 1802 or 1803 are manufactured from an elastomeric or visco-elastomeric material disclosed in patent applications which have been incorporated by reference above. Body 1801 is made from a different material, or a different formulation of the same type of material, than zones 1802 and 1803. The zones may also be made from different formulations of the same material or different materials. Body 1801 and/or zone 1802 and/or zone 1803 may also have more than one layer of material, as described in FIG. 6 and the accompanying text. In a preferred embodiment, body 1801 is made from an elastomeric material and secondary cushioning zones 1802, 1803 are made from the visco-elastomeric material disclosed herein.

Figure 19:
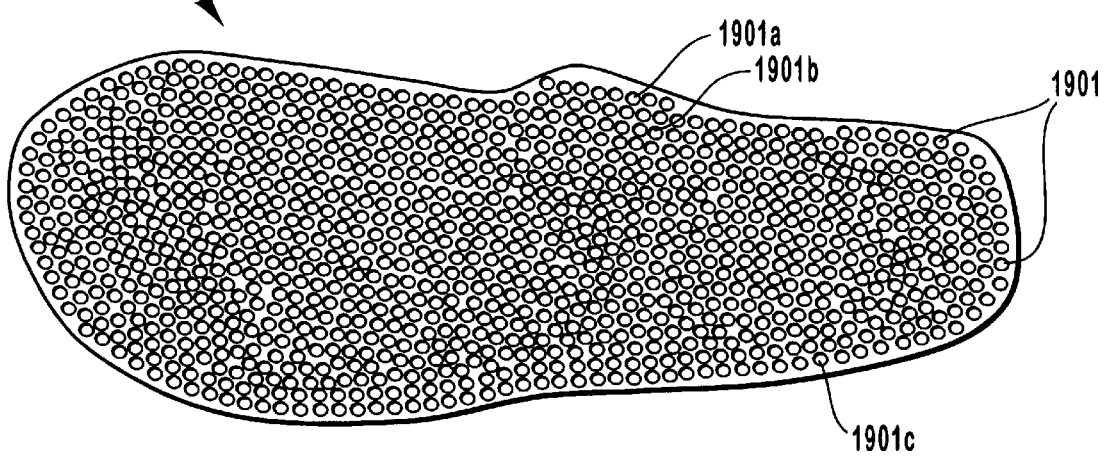
FIG. 19 depicts a pad with openings for air flow.

FIG. 19 shows a top plan view of a pad 1900 according to the invention which includes several openings formed therethrough, referred to as hollow cylinders 1901a, 1901b, 1901c, etc. Hollow cylinders 1901 facilitate airflow through pad 1900 to the user's foot. Preferably, hollow cylinders 1901 also deform as a load is placed on the solid areas between cylinders 1901a and 1901b facilitating increased flow of the material. Cylinders maybe spaced apart at any distance, and may cover the entire surface of pad 1900, or one or more portions thereof.

Figure 20:
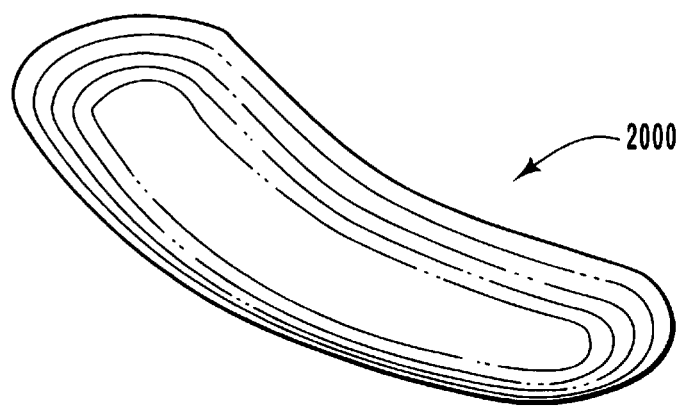
FIG. 20 depicts a heel liner.
Figure 21:
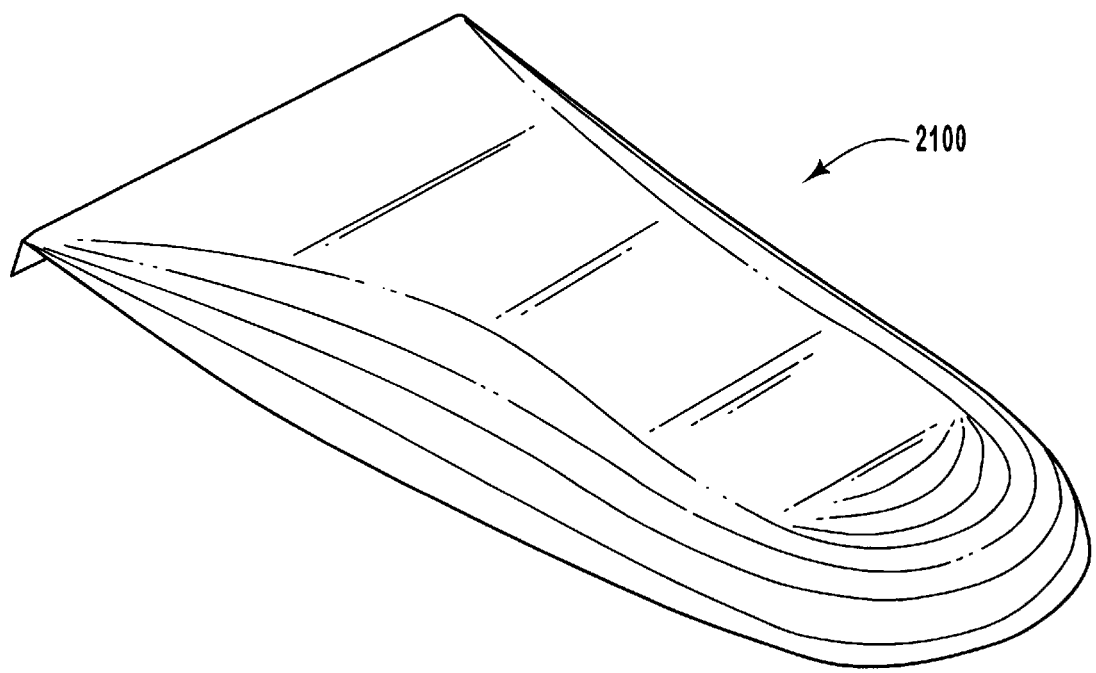
FIG. 21 depicts a ¾ length insole.
Figure 22:
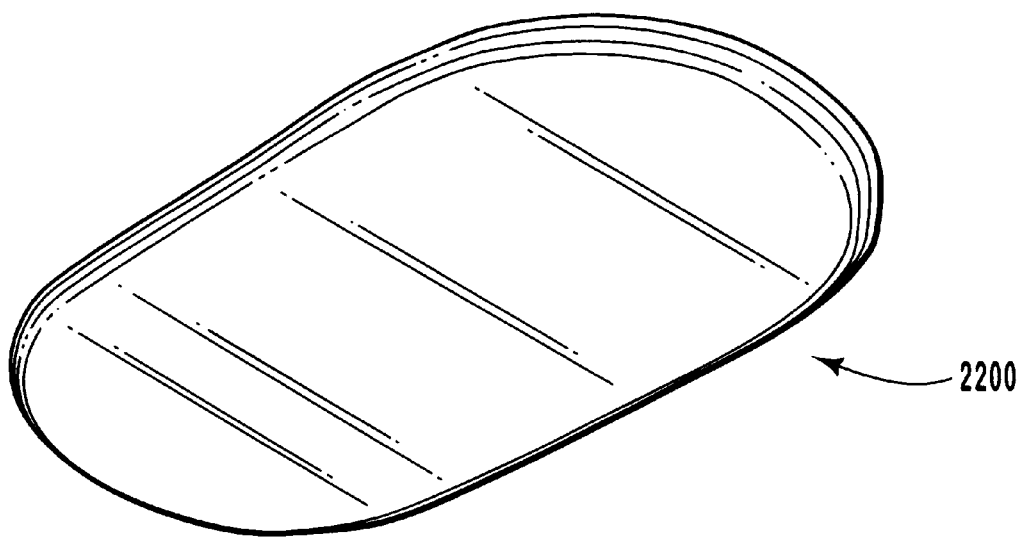
FIG. 22 depicts a heel pad.
Figure 23:
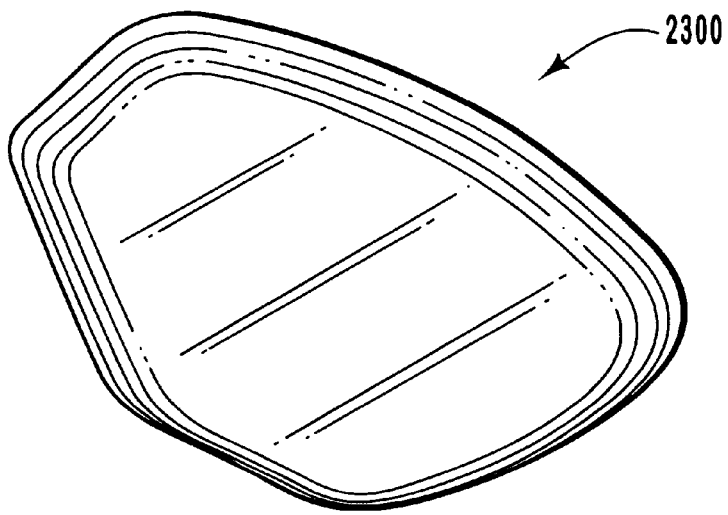
Figure 24:
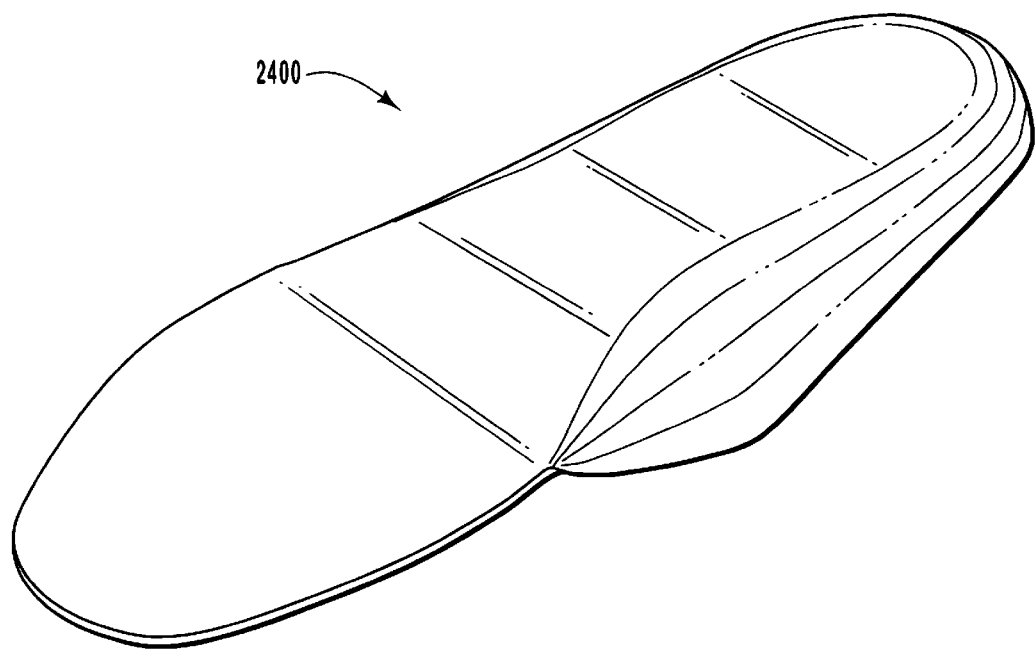
FIG. 24 depicts a metatarsal pad.
Figure 25:
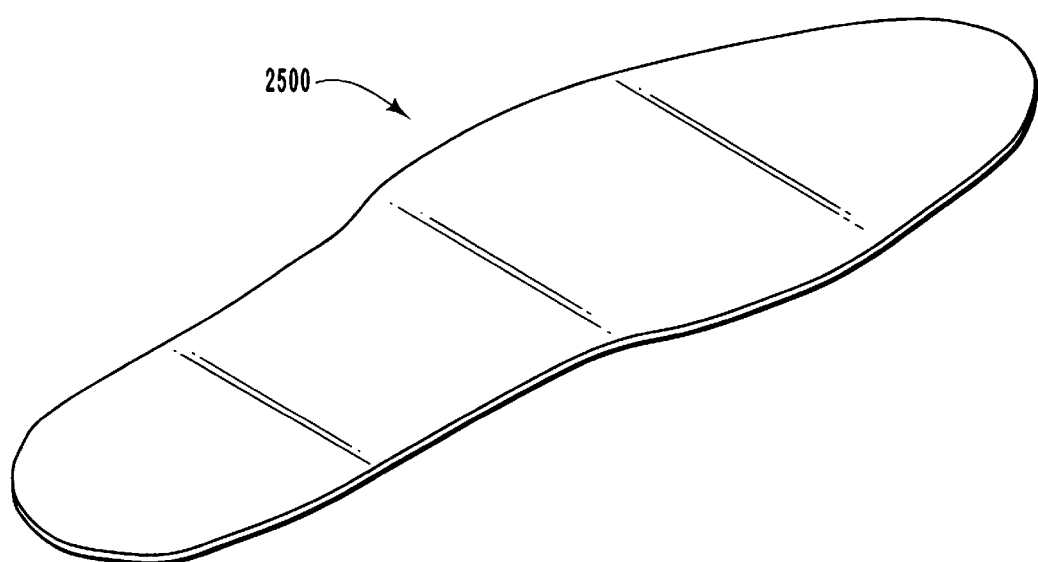
FIG. 25 depicts a full insole.
Figure 26:
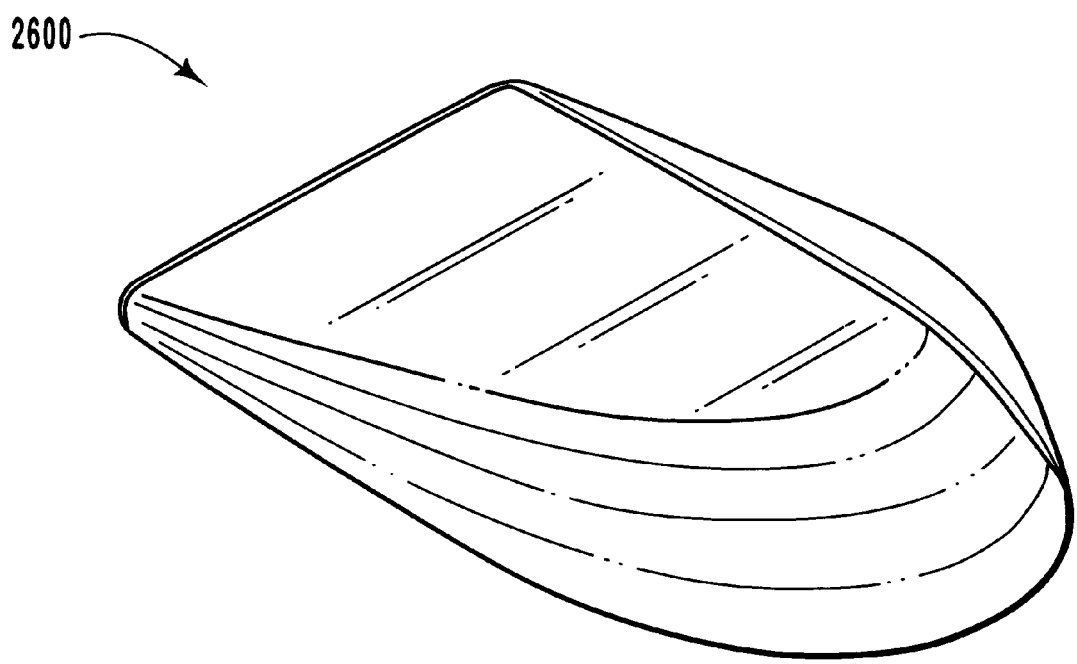
FIG. 26 depicts a heel cup.

With reference to FIGS. 20–25, other preferred podalic pads of the invention are depicted. Preferably these pads are manufactured according to the formula of Example VI above. In FIG. 20, pad 2000 is a heel liner for use in footwear. In FIG. 21, pad 2100 is a ¾ length molded insole for use in footwear. In FIG. 22, pad 2200 is a heel pad for use in footwear. In FIG. 23, pad 2300 is a metatarsal pad for use in footwear. In FIG. 24, pad 2400 is a full molded or contoured insole pad for use in footwear. In FIG. 25, pad 2500 is a flat insole for use in footwear. In FIG. 26, pad 2600 is a heel cup for use in footwear. Preferably these pads are manufactured by injection molding. Referring to the above figures, it can be seen that each pad has a proximal surface against which a user's foot (including sock) would make contact, a distal surface which would contact the footwear in which the pad is used, and an outer periphery where the proximal and distal surfaces meet. The pad itself is made from a padding material such as those in the Examples above, variations of them, or other materials within the inventive concept.

Other podalic pads are also within the scope of the present invention, including without limitation, pads made with at least one of the preferred materials which line the upper of a shoe, pads with at least one of the preferred materials which cushion abnormalities and ailments on the foot. In particular, while many pads of the invention are useful for ordinary daily use and comfort, other specialized pads of the invention may be configured to specifically relieve pain from and facilitate healing of corns, calluses, bunions and other foot ailments. Similarly, the podalic pads of this invention may incorporate multiple layers, secondary cushioning zones and hollow cylinders in any combination, or none of them.

Although the description above contains many specifics, these should not be construed as limiting the scope of the invention, but as merely providing illustrations of some of the presently preferred embodiments of this invention. The scope of the invention should be determined by the appended claims and their legal equivalents, rather than by the disclosure herein.

What is claimed is:

1. A podalic pad comprising:
a proximal surface adapted for contact with a user's foot,
a distal surface adapted for contact with footwear,
an outer periphery defining a border between said proximal and distal surfaces,
a padding material existing between said proximal and said distal surfaces, said padding material including:
an A-B-A triblock copolymer,
a plasticizing mineral oil,
at least one antioxidant, and
a bleed reducing agent; wherein said bleed reducing agent comprises flourochemical alcohol.

2. A podalic pad comprising:
a proximal surface adapted for contact with a user's foot,
a distal surface adapted for contact with footwear,
an outer periphery defining a border between said proximal and distal surfaces,
a padding material existing between said proximal and said distal surfaces, said padding material including:
an elastomeric material having:
a plasticizer and
a triblock copolymer of the general configuration A-B-A;
wherein B is a hydrogenated polymer polymer including ethylene/propylene and ethylene/butylene;
wherein a mixture including about 20 weight percent of said triblock copolymer and about 80 weight percent toluene, the weight percentages based on the total weight of the mixture, at about 25 degrees Celsius to about 30 degrees Celsius does not form a solution;
wherein said plasticizer associates with said hydrogenated polymer B;
wherein said triblock copolymer has a measurable percent elongation at break;
wherein said plasticizer tends to increase the percent elongation at break of said triblock copolymer;
wherein said triblock copolymer has a rigidity measurable on the Gram Bloom scale; and
wherein said plasticizer tends to decrease the Gram Bloom rigidity of said triblock copolymer.

3. A podalic pad comprising:
a proximal surface adapted for contact with a user's foot,
a distal surface adapted for contact with footwear,
an outer periphery defining a border between said proximal and distal surfaces,
a padding material existing between said proximal and said distal surfaces, said padding material including:
a gelatinous elastomeric material comprising:
a triblock copolymer of the general configuration A-B-A,
a plasticizing agent;
wherein said triblock copolymer and said plasticizing agent form a gelatinous material;
wherein A is selected from the group of monoalkenylarene polmers;
wherein B is a hydrogenated polymer comprising a plurality of covalently linked diene monomers;
wherein said A-B-A triblock copolymer has a weight average molecular weight of at least about 250,000;
wherein said plasticizer comprises at least about 60 percent by weight of the gelatinous material.

4. A podalic pad comprising:
a proximal surface adapted for contact with a user's foot,
a distal surface adapted for contact with footwear,
an outer periphery defining a border between said proximal and distal surfaces,
a padding material existing between said proximal and said distal surfaces, said padding material including:
a gelatinous elastomeric material comprising:
a triblock copolymer of the general configuration A-B-A,
a plasticizing agent;
wherein said triblock copolymer and said plasticizing agent form a gelatinous material;
wherein A is selected from the group of monoalkenylarene polmers;
wherein B is a hydrogenated polymer comprising a plurality of covalently linked diene monomers;
wherein said A-B-A triblock copolymer has a weight average molecular weight of at least about 250,000.

5. A podalic pad comprising:
a proximal surface adapted for contact with a user's foot,
a distal surface adapted for contact with footwear,
an outer periphery defining a border between said proximal and distal surfaces,
a padding material existing between said proximal and said distal surfaces, said padding material including:
an elastomeric material having:
a triblock copolymer elastomer of the configuration A-B-A and having a weight average molecular weight of at least about 250,000, block A being a non-elastomeric polymer and block B being an elastomeric polymer; and
a plasticizer combined with said triblock copolymer elastomer to form a visco-elastic material, said plasticizer being compatible with said B block.

6. A podalic pad as recited in claim 5 wherein said A-B-A triblock copolymer has a measurable solution viscosity at 10% solids in 90% toluene at 25 degrees Celsius.

* * * * *